United States Patent
Ishikawa et al.

(10) Patent No.: US 9,709,806 B2
(45) Date of Patent: Jul. 18, 2017

(54) HEAD-MOUNTED DISPLAY AND IMAGE DISPLAY APPARATUS

(71) Applicant: Sony Corporation, Tokyo (JP)

(72) Inventors: Hirotaka Ishikawa, Kanagawa (JP); Takeshi Iwatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 14/394,514

(22) PCT Filed: Dec. 16, 2013

(86) PCT No.: PCT/JP2013/007386
§ 371 (c)(1),
(2) Date: Oct. 15, 2014

(87) PCT Pub. No.: WO2014/128810
PCT Pub. Date: Aug. 28, 2014

(65) Prior Publication Data
US 2015/0049002 A1 Feb. 19, 2015

(30) Foreign Application Priority Data

Feb. 22, 2013 (JP) ................................. 2013-033076

(51) Int. Cl.
*G02B 27/01* (2006.01)
*G06T 19/00* (2011.01)
(Continued)

(52) U.S. Cl.
CPC ..... *G02B 27/0172* (2013.01); *G02B 27/0093* (2013.01); *G02B 27/017* (2013.01);
(Continued)

(58) Field of Classification Search
CPC .............. G02B 27/017; G02B 27/0172; G02B 27/0176; G02B 27/0093;
(Continued)

(56) References Cited

U.S. PATENT DOCUMENTS 5,742,264 A     4/1998  Inagaki et al.
6,396,497 B1 *  5/2002  Reichlen ................. G06F 3/011
                                                    345/427
(Continued)

FOREIGN PATENT DOCUMENTS

CN     102868897 A    1/2013
JP     7-085316       3/1995
(Continued)

OTHER PUBLICATIONS

Office Action issued in connection with Japanese Patent Application No. 2014-544283 dated Jul. 21, 2015. (5 pages).
(Continued)

*Primary Examiner* — Priyank Shah
(74) *Attorney, Agent, or Firm* — K&L Gates LLP

(57) ABSTRACT

A head-mounted display according to an embodiment of the present technology includes a display unit, a detector, and a first control unit. The detector detects an azimuth of the display unit around at least one axis. The first control unit includes a region limiter, storage unit, and a display control unit. The region limiter is configured to be capable of limiting a display region of the field of view along a direction of the one axis in three-dimensional coordinates surrounding the display unit. The storage unit stores images that should be displayed in the field of view with the images being made corresponding to the three-dimensional coordinates. The display control unit displays, based on an output of the detector, an image in the three-dimensional coordinates, which corresponds to the azimuth, in the field of view.

19 Claims, 15 Drawing Sheets

(51) Int. Cl.
*G06F 3/01* (2006.01)
*G09G 3/00* (2006.01)
*G09G 5/00* (2006.01)
*G02B 27/00* (2006.01)

(52) U.S. Cl.
CPC ......... *G02B 27/0179* (2013.01); *G06F 3/012* (2013.01); *G06T 19/003* (2013.01); *G06T 19/006* (2013.01); *G09G 3/003* (2013.01); *G09G 5/006* (2013.01); *G02B 2027/0178* (2013.01); *G02B 2027/0187* (2013.01); *G02B 2027/0198* (2013.01); *G09G 2320/10* (2013.01); *G09G 2340/0492* (2013.01); *G09G 2340/14* (2013.01); *G09G 2340/145* (2013.01)

(58) Field of Classification Search
CPC ............... G02B 2027/0132–2027/0136; G02B 2027/0174; G02B 2027/0178
See application file for complete search history.

(56) References Cited

U.S. PATENT DOCUMENTS

| | | | | |
|---|---|---|---|---|
| 6,636,826 B1* | 10/2003 | Abe | ............... | G01C 19/56 702/151 |
| 7,132,214 B2 | 11/2006 | Taylor et al. | | |
| 2009/0189974 A1* | 7/2009 | Deering | ............... | G09G 3/02 348/46 |
| 2012/0050143 A1 | 3/2012 | Border et al. | | |
| 2012/0127284 A1* | 5/2012 | Bar-Zeev | ............. | G02B 27/017 348/53 |
| 2013/0083173 A1* | 4/2013 | Geisner | ................ | G06F 3/013 348/51 |
| 2013/0113900 A1* | 5/2013 | Ortlieb | ................ | A61C 3/00 348/51 |
| 2013/0135353 A1* | 5/2013 | Wheeler | .............. | G09G 3/003 345/660 |
| 2013/0235169 A1 | 9/2013 | Kato et al. | | |
| 2013/0246967 A1* | 9/2013 | Wheeler | ................ | G06F 3/012 715/784 |
| 2013/0254525 A1* | 9/2013 | Johnson | .................. | G06F 3/012 713/100 |
| 2013/0342572 A1* | 12/2013 | Poulos | ................ | G02B 27/017 345/633 |
| 2014/0184475 A1* | 7/2014 | Tantos | ................ | H03M 13/356 345/8 |
| 2014/0225918 A1* | 8/2014 | Mittal | ..................... | G06F 3/017 345/633 |
| 2015/0199081 A1* | 7/2015 | Wheeler | ................ | G06F 3/0482 715/781 |
| 2016/0239252 A1* | 8/2016 | Nakagawa | .............. | G06F 3/012 |

FOREIGN PATENT DOCUMENTS

| | | |
|---|---|---|
| JP | 11-153987 | 6/1999 |
| JP | 2000-184398 | 6/2000 |
| JP | 2007-316568 | 12/2007 |
| JP | 2012-053643 | 3/2012 |
| JP | 2013-015796 | 1/2013 |
| WO | 2012/172719 A1 | 12/2012 |

OTHER PUBLICATIONS

Chinese Office Action (with English translation) issued Jun. 24, 2016 in corresponding Chinese application No. 201480001045.9 (11 pages).

International Search Report issued in connection with International Patent Application No. PCT/JP2013/007386 dated Mar. 18, 2014. (2 pages).

Supplementary European Search Report issued Sep. 28, 2016 in corresponding European application No. 13875857.8 (9 pages).

Chinese Office Action (with English translation) issued Dec. 5, 2016 in corresponding Chinese application No. 201480001045.9 (15 pages).

* cited by examiner

HEAD-MOUNTED DISPLAY AND IMAGE DISPLAY APPARATUS

CROSS REFERENCES TO RELATED APPLICATIONS

The present application is a national stage of International Application No. PCT/JP2013/007386 filed on Dec. 12, 2013 and claims priority to Japanese Patent Application No. 2013-033076 filed on Feb. 22, 2013, the disclosure of which is incorporated herein by reference.

BACKGROUND

The present technology relates to a head-mounted display and an image display apparatus that are capable of displaying an image including particular information in a display field-of-view.

There is known a technique of adding a corresponding image to the real space, which is called augmented reality (AR). For example, Patent Document 1 describes a stereoscopic synthesis device capable of displaying three-dimensional shape information of an arbitrary object in a real space to which an observer belongs. Further, Patent Document 2 describes a head-mounted display capable of displaying an object relating to a target present in an external world viewed by a user.

Patent Document 1: Japanese Patent Application Laid-open No. 2000-184398

Patent Document 2: Japanese Patent Application Laid-open No. 2012-053643

SUMMARY

Problem to be Solved by the Invention

In recent years, in a see-through-type head-mounted display, for example, there is a case where it is desirable to limit an information display area while ensuring a see-through area. In this case, there is a fear that it is difficult for an object to enter a field of view of a display or it is difficult to keep a state in which the object is in the field of view.

In view of the above-mentioned circumstances, it is an object of the present technology to provide a head-mounted display and an image display apparatus that are capable of enhancing the searchability or visibility of an object.

Means for Solving the Problem

In order to achieve the object above, a head-mounted display according to an embodiment of the present technology includes a display unit, a detector, and a first control unit.

The display unit is mountable on a head of a user and configured to be capable of providing the user with a field of view of a real space.

The detector detects an azimuth of the display unit around at least one axis.

The first control unit includes a region limiter, storage unit, and a display control unit. The region limiter is configured to be capable of limiting a display region of the field of view along a direction of the one axis in three-dimensional coordinates surrounding the display unit. The storage unit stores images that should be displayed in the field of view with the images being made corresponding to the three-dimensional coordinates. The display control unit displays, based on an output of the detector, an image in the three-dimensional coordinates, which corresponds to the azimuth, in the field of view.

According to the head-mounted display, the probability that the image displayed in accordance with a change in attitude around the one axis enters the field of view of the user is higher, and hence it is possible to enhance the searchability of the image. Further, it is possible to easily keep the state in which the image is in the field of view, and hence it is also possible to enhance the visibility of the image.

The "azimuth of the display unit" typically means a front direction of the display unit. Regarding the head-mounted display, the front direction of the display unit can be defined as a front direction of the user. Thus, the "azimuth of the display unit" can be interpreted as being the same as a direction of the face of the user.

The "azimuth of the display unit around the one axis" means an azimuth of the display unit with the one axis being a center. For example, in the case where the one axis is a vertical axis, horizontal directions of the east, west, south, and north correspond to it. In this case, for example, if the north is set as a reference azimuth, an angle from this azimuth can indicate the azimuth of the display unit. On the other hand, if the one axis is a horizontal axis, the azimuth of the display unit around the one axis can be indicated by an angle of elevation or an angle of depression with a horizontal plane being a reference. The one axis is not limited to such examples. The one axis may be another axis intersecting the vertical axis and the horizontal axis.

The detector may detect an azimuth of the display unit around a vertical axis, and the region limiter may limit a region in a height direction in cylindrical coordinates around the vertical axis in accordance with a region of the field of view in a vertical direction. With this, it is possible to enhance the searchability and the visibility of the image in the horizontal field of view of the user.

In this case, the region limiter may limit the region in the height direction in the cylindrical coordinates to a height such that at least part of the images stored in the storage unit is displayed in the field of view. With this, it is possible to easily recognize the image present at a certain azimuth.

The display control unit may move, when the azimuth is changed by a first predetermined angle or larger, the image in the field of view in accordance with a change in azimuth, and fix a display position of the image in the field of view when the change in azimuth is smaller than the first predetermined angle. With this, it is possible to regulate the movement of the image, which results from an unintended change in attitude of the user around the vertical axis, and to enhance the visibility of the image.

The detector may be configured to further detect a change in attitude of the display unit around a horizontal axis. In this case, the display control unit moves, when the change in attitude is equal to or larger than a second predetermined angle, the image in the field of view in accordance with the change in attitude, and fixes, when the change in attitude is smaller than the second predetermined angle, the display position of the image in the field of view. With this, it is possible to regulate the movement of the image, which results from an unintended change in attitude of the user around the horizontal axis, and to further enhance the visibility of the image.

The display control unit may move the image to a predetermined position in the field of view when a change in output of the detector is equal to or smaller than a predetermined value over a predetermined time. That is, if the output of the detector is not changed over a predetermined time, the probability that the user is referring to the image displayed in the field of view is high, and hence the visibility of the image is increased by moving the image to the predetermined position in the field of view. The predetermined position may be, for example, the center of the field of view. In addition, the image after movement may be displayed in an enlarged state.

Alternatively, the display control unit may move the image to a predetermined position in the field of view when an input of a predetermined signal generated according to an operation of the user is detected. Also with this configuration, it is possible to increase the visibility of the image as described above and to control the display of the image according to the intention of the user.

The display control unit may cancel, when a change in output of the detector is equal to or higher than a predetermined frequency in a state in which the image is displayed at a predetermined position in the field of view, a frequency component of the output of the detector, which is equal to or higher than the predetermined frequency. For example, the predetermined frequency is set to a frequency corresponding to a shake of the face of the user. With this, it is possible to ensure the visibility of the image without receiving the influence of the slight shake of the face of the user.

The first control unit may be configured to limit, when an input of a predetermined signal generated according to an operation of the user is detected, a region in the height direction in the three-dimensional coordinates in accordance with a region of the field of view in the direction of the one axis, and adjust all the images displayed in the field of view to the same height in the field of view. With this, it is possible to further enhance the visibility of the image displayed in the field of view.

The image can include information relating to a predetermined target present in the field of view. With this, it is possible to provide information relating to the target to the user. Further, the image may be a still image or may be a moving image such as an animation image.

The detector is not particularly limited as long as it can detect a change in azimuth or attitude of the display unit. For example, a terrestrial magnetism sensor, a motion sensor, a combination thereof, or the like can be employed.

The head-mounted display may further include a second control unit including an image acquisition unit that acquires a plurality of images stored in the storage unit.

The first control unit may be configured to request the second control unit to transmit one or more images selected from among the plurality of images. Necessary images can be acquired mainly by the first control unit in a necessary order in this manner, and hence it is possible to construct a system that overcomes problems of communication speed between the first and second control units, a time from issue of the transmission request to actual transmission of the image (latency), and the like.

In this case, the first control unit may be configured to request the second control unit to preferentially transmit an image made corresponding to a coordinate position closer to the display region of the field of view in the three-dimensional coordinates.

Note that, in the case where the image is an animation image, priority setting only needs to be performed in view of a current time and an animation frame time. For example, the first control unit may be configured to request the second control unit to collectively transmit at least some of all images constituting the animation image.

The first control unit may be configured to regularly evaluate, with respect to all the images stored in the storage unit, a distance between the coordinate position and the display region of the field of view and remove an image at a coordinate position furthest from the display region of the field of view from the storage unit. With this, it is possible to reduce the capacity of the storage unit.

The second control unit may further include a position information acquisition unit that is capable of acquiring position information of the display unit. The image acquisition unit acquires an image corresponding to the position information that can be transmitted to the first control unit. With this, the second control unit can acquire an optimal image in accordance with a current position of the user.

An image display apparatus according to an embodiment of the present technology includes a display unit, a detector, a region limiter, a storage unit, and a display control unit.

The display unit includes a display surface that is capable of displaying a real space.

The detector detects an azimuth of the display unit around at least one axis.

The region limiter is configured to be capable of limiting a display region of the field of view along a direction of the one axis in three-dimensional coordinates surrounding the display unit.

The storage unit stores images that should be displayed in the field of view with the images being made corresponding to the three-dimensional coordinates.

The display control unit displays, based on an output of the detector, an image in the three-dimensional coordinates, which corresponds to the azimuth, in the field of view.

Effect of the Invention

As described above, according to the present technology, it is possible to enhance the searchability or visibility of an object image.

Additional features and advantages are described herein, and will be apparent from the following Detailed Description and the figures.

DETAILED DESCRIPTION

Hereinafter, embodiments according to the present technology will be described with reference to the drawings. In this embodiment, an example in which the present technology is applied to a head-mounted display as an image display apparatus will be described.

First Embodiment

Figure 1:
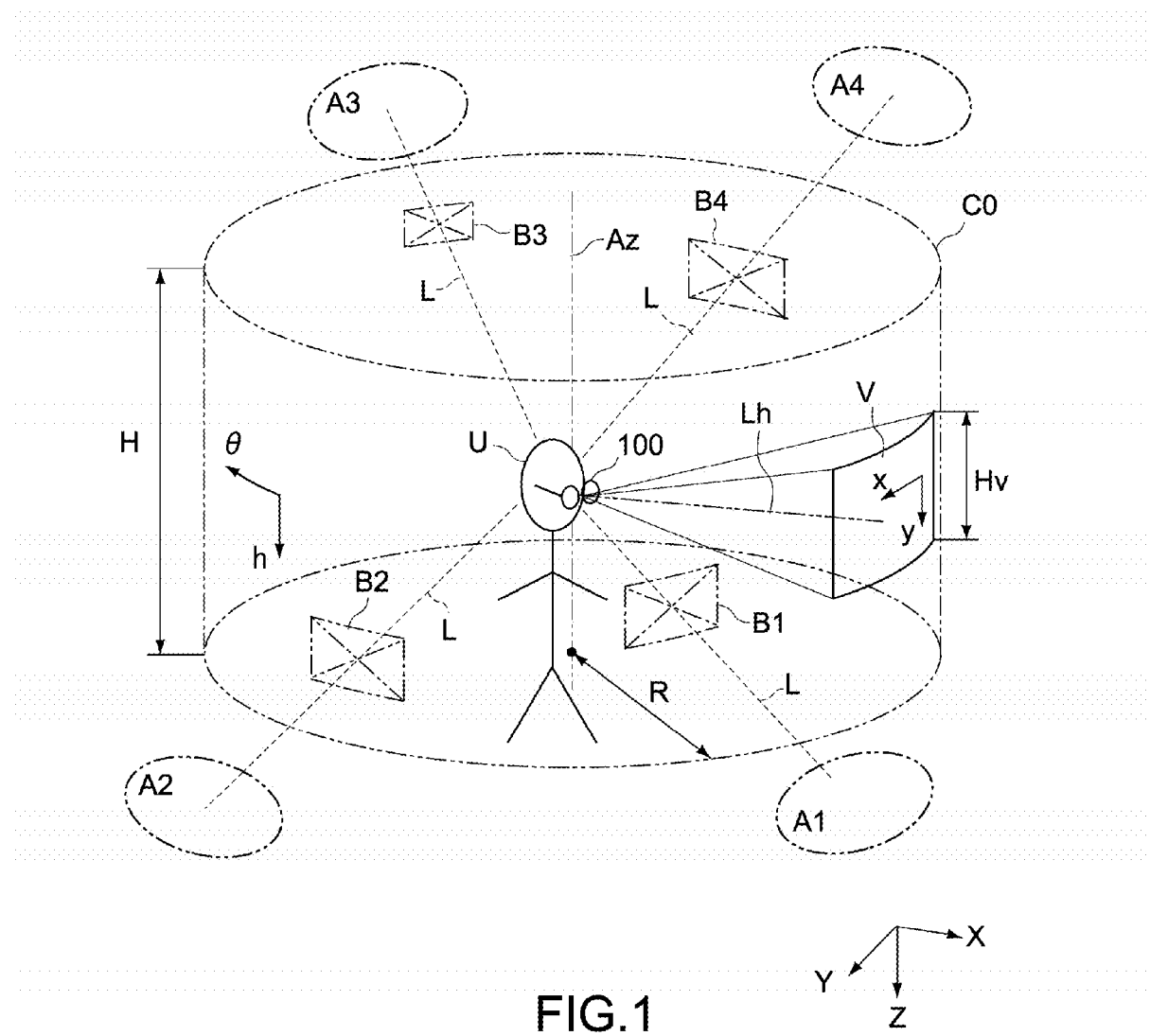
FIG. 1 A schematic view for describing functions of a head-mounted display according to an embodiment of the present technology.

FIG. 1 is a schematic view for describing functions of a head-mounted display (hereinafter, referred to as HMD) according to an embodiment of the present technology. First, referring to FIG. 1, an outline of basic functions of the HMD according to this embodiment will be described.

In FIG. 1, an X-axis direction and a Y-axis direction show horizontal directions orthogonal to each other and a Z-axis direction shows a vertical axis direction. Such an XYZ orthogonal coordinate system expresses a coordinate system of a real space to which a user belongs. An X-axis arrow indicates a north direction and a Y-axis arrow indicates an east direction. Further, a Z-axis arrow indicates a gravity direction.

[Outline of Functions of HMD]

An HMD 100 according to this embodiment is mounted on the head of a user U and configured to be capable of displaying a virtual image in a field of view V (display field-of-view) of a real space of the user U. The image displayed in the field of view V includes information relating to predetermined targets A1, A2, A3, and A4 present in the field of view V. The predetermined targets are, for example, landscape, shops, or goods surrounding the user U.

The HMD 100 stores images (hereinafter, referred to as objects) B1, B2, B3, and B4 made corresponding to a virtual world coordinate system surrounding the user U who wears the HMD. The world coordinate system is a coordinate system equivalent to the real space to which the user belongs. In the world coordinate system, the targets A1 to A4 are positioned with the position of the user U and a predetermined axis direction being references. Although cylindrical coordinates C0 with the vertical axis being a center of axis are employed as the world coordinates in this embodiment, other three-dimensional coordinates such as celestial coordinates with the user U being a center may be employed.

A radius R and a height H of the cylindrical coordinates C0 can be arbitrarily set. Although the radius R is set to be shorter than a distance from the user U to the targets A1 to A4 here, the radius R may be longer than the distance. Further, the height H is set to be equal to or larger than a height (vertical length) Hv of the field of view V of the user U, which is provided through the HMD 100.

The objects B1 to B4 are images showing information relating to the targets A1 to A4 present in the world coordinate system. The objects B1 to B4 may be images including letters, patterns, and the like or may be animation images. Alternatively, the objects may be two-dimensional images or may be three-dimensional images. In addition, the object shape may be a rectangular shape, a circular shape, or another geometric shape and can be appropriately set depending on the kind of object.

Coordinate positions of the objects B1 to B4 in the cylindrical coordinates C0 are, for example, made corresponding to intersection positions of lines of sight L of the user who gazes at the targets A1 to A4 and the cylindrical coordinates C0. Although center positions of the objects B1 to B4 are made coincide with the intersection positions in the illustrated example, it is not limited thereto and part of peripheries (e.g., part of four corners) of the objects may be made coincide with the intersection positions. Alternatively, the coordinate positions of the objects B1 to B4 may be made corresponding to any positions spaced apart from the intersection positions.

The cylindrical coordinates C0 have a coordinate axis (θ) in a circumferential direction that expresses an angle around the vertical axis with the north direction being 0° and a coordinate axis (h) in a height direction that expresses an angle in upper and lower directions with a horizontal line of sight Lh of the user U being a reference. The coordinate axis (θ) has a positive direction from the west to the east. The coordinate axis (h) uses the angle of depression as a positive direction and the angle of elevation as a negative direction.

As will be described later, the HMD 100 includes a detector for detecting a direction of the eyes of the user U and determines, based on the output of the detector, which region in the cylindrical coordinates C0 the field of view V of the user U corresponds to. If any object (e.g., object B1) is present in the corresponding region of an xy-coordinate system, which forms the field of view V, the HMD 100 displays (draws) the object B1 in the corresponding region.

As described above, the HMD 100 according to this embodiment displays the object B1 in the field of view V while being overlapped with the target A1 in the real space, to thereby provide the user U with information relating to the target A1. Further, the HMD 100 can provide the objects (B1 to B4) relating to the predetermined targets A1 to A4 to the user U in accordance with the azimuth or direction of the eyes of the user U.

Figure 2:
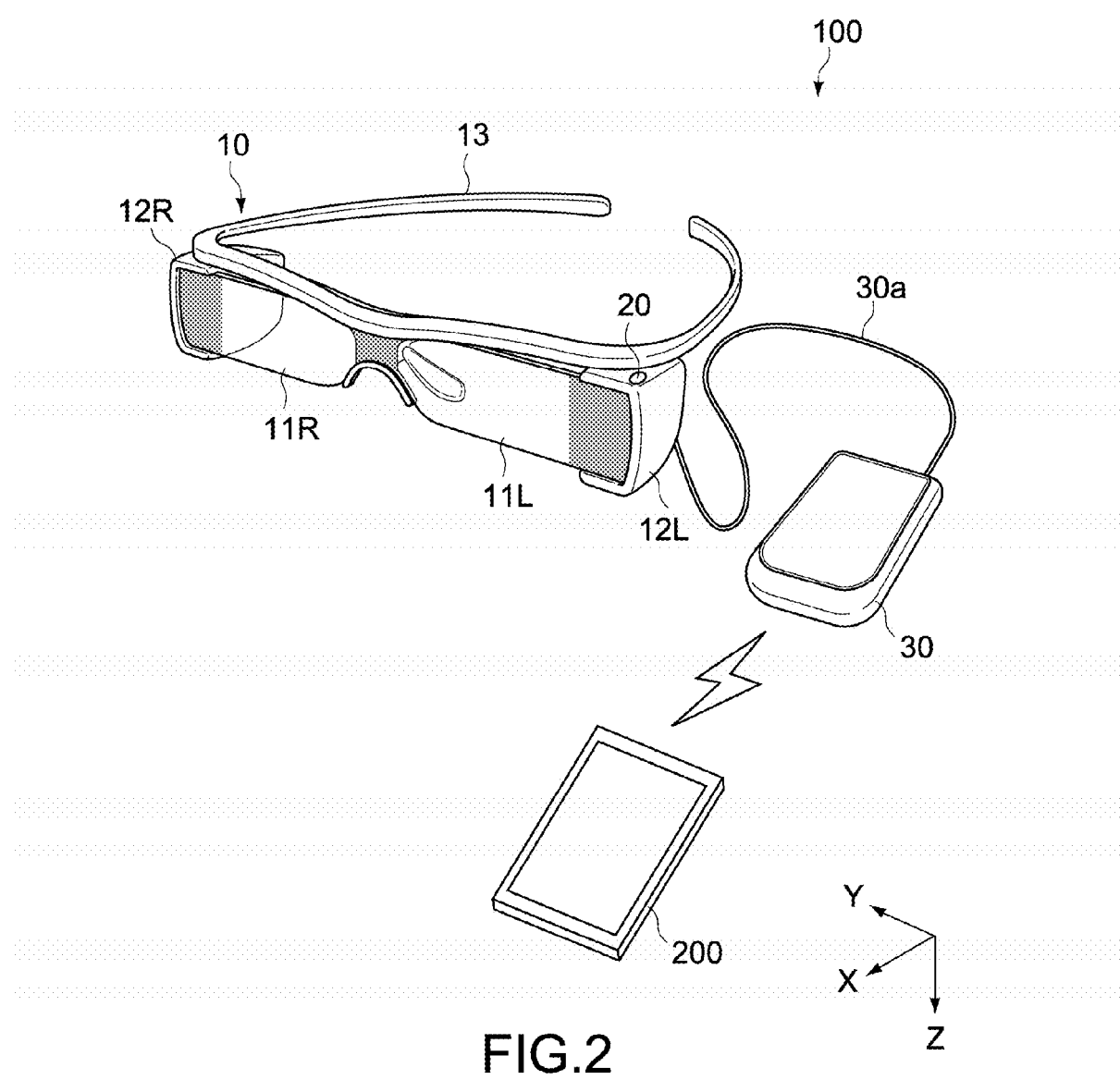
FIG. 2 A general view showing the head-mounted display.
Figure 3:
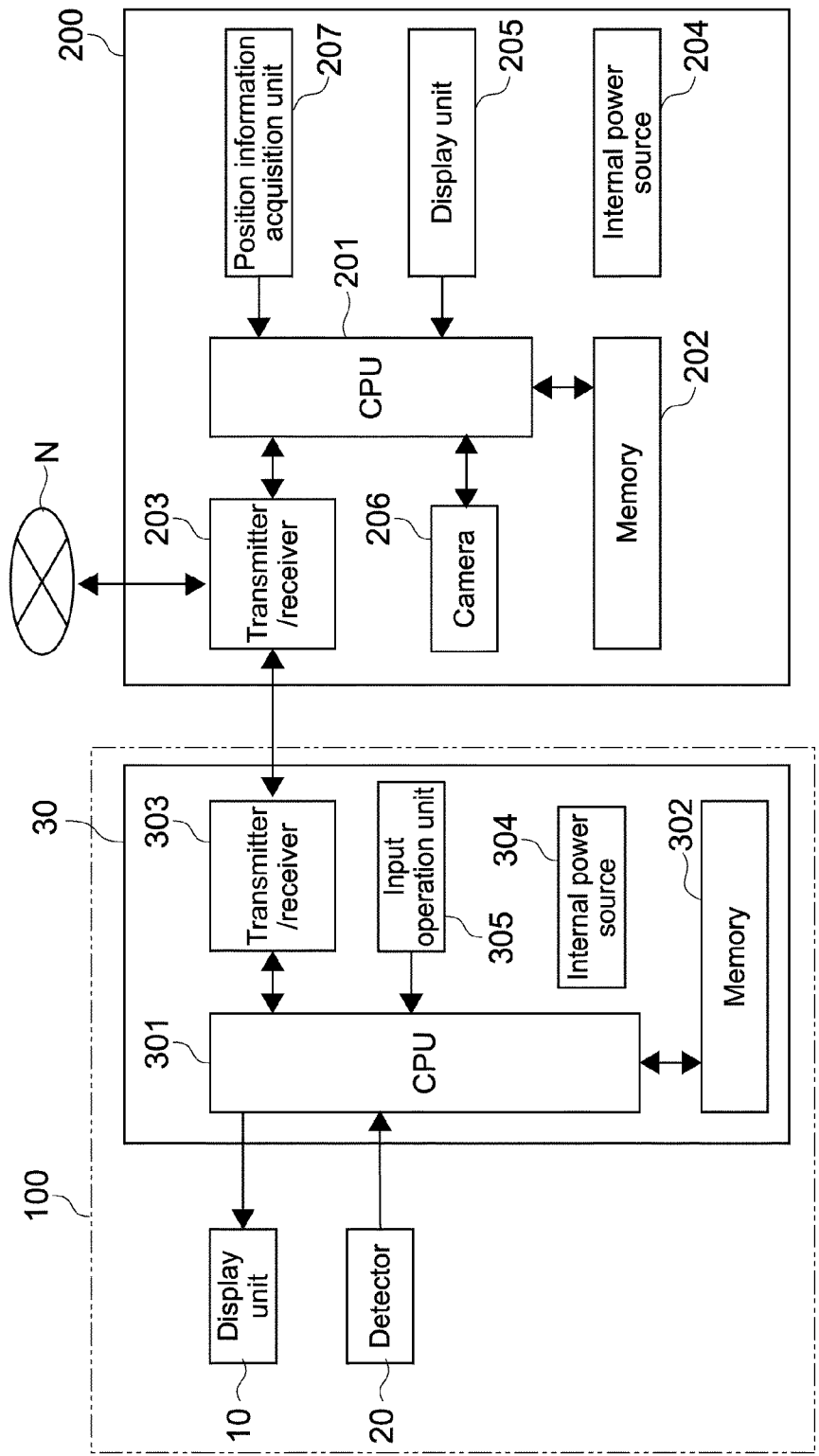
FIG. 3 A block diagram showing a configuration of a system including the head-mounted display.

Next, the HMD 100 will be described in detail. FIG. 2 is a general view showing the HMD 100 and FIG. 3 is a block diagram showing a configuration thereof.

[Configuration of HMD]

The HMD 100 includes a display unit 10, a detector 20 that detects an attitude of the display unit 10, and a control unit 30 that controls driving of the display unit 10. In this embodiment, the HMD 100 is constituted of a see-through-type HMD capable of providing the user with the field of view V of the real space.

(Display Unit)

The display unit 10 is configured to be mountable on the head of the user U. The display unit 10 includes first and second display surfaces 11R and 11L, first and second image generators 12R and 12L, and a support 13.

The first and second display surfaces 11R and 11L are constituted of optical elements having transparency that can provide the right eye and left eye of the user U with the real space (external field of view). The first and second image generators 12R and 12L are configured to be capable of generating images to be presented to the user U via the first and second display surfaces 11R and 11L. The support 13 supports the display surfaces 11R and 11L and the image generators 12R and 12L. The first and second display surfaces 11L and 11R have a suitable shape such that they are mountable on the head of the user to be opposed to the right eye and left eye of the user U, respectively.

The thus configured display unit 10 is configured to be capable of providing the user U with the field of view V with predetermined images (or virtual images) being overlapped with the real space, through the display surfaces 11R and 11L.

(Detector)

The detector 20 is configured to be capable of detecting a change in azimuth or attitude of the display unit 10 around at least one axis. In this embodiment, the detector 20 is configured to detect changes in azimuth or attitude of the display unit 10 around the X-, Y-, and Z-axes.

The azimuth of the display unit 10 typically means a front direction of the display unit. In this embodiment, the azimuth of the display unit 10 is defined as a face direction of the user U.

The detector 20 can be constituted of a motion sensor such as an angular velocity sensor and an acceleration sensor or a combination thereof. In this case, the detector 20 may be constituted of a sensor unit in which the angular velocity sensor and the acceleration sensor are arranged in three axis directions or a different sensor may be used for each axis. For example, an integrated value of the output of the angular velocity sensor can be used for a change in attitude of the display unit 10, a direction of the change, the amount of change thereof, or the like.

Further, a terrestrial magnetism sensor may be employed for detecting the azimuth of the display unit 10 around the vertical axis (Z-axis). Alternatively, the terrestrial magnetism sensor and the motion sensor may be combined. With this, it becomes possible to detect a change in azimuth or attitude with a high accuracy.

The detector 20 is located at an appropriate position in the display unit 10. The position of the detector 20 is not particularly limited. For example, the detector 20 is located on either one of the image generators 12R and 12L or part of the support 13.

(Control Unit)

The control unit 30 (first control unit) generates, based on the output of the detector 20, a control signal for controlling driving of the display unit 10 (image generators 12R and 12L). In this embodiment, the control unit 30 is electrically connected to the display unit 10 via a connection cable 30a. Of course, the control unit 30 is not limited thereto. The control unit 30 may be connected to the display unit 10 by wireless communication.

As shown in FIG. 3, the control unit 30 includes a CPU 301, a memory 302 (storage unit), a transmitter/receiver 303, an internal power source 304, and an input operation unit 305.

The CPU 301 controls an operation of the entire HMD 100. The memory 302 includes a read only memory (ROM), a random access memory (RAM), and the like and stores programs and various parameters for controlling the HMD 100 by the CPU 301, images (objects) that should be displayed on the display unit 10, and other necessary data. The transmitter/receiver 303 constitutes an interface for communication with a portable information terminal 200, which will be described later. The internal power source 304 supplies a power necessary for driving the HMD 100.

The input operation unit 305 serves to control images displayed on the display unit 10 according to a user operation. The input operation unit 305 may be constituted of a mechanical switch or may be constituted of a touch sensor. The input operation unit 305 may be provided in the display unit 10.

The HMD 100 may further include an audio output unit such as a speaker, a camera, and the like. In this case, the audio output unit and the camera are typically provided in the display unit 10. In addition, the control unit 30 may be provided with a display device that displays an input operation screen or the like of the display unit 10. In this case, the input operation unit 305 may be constituted of a touch panel provided in the display device.

(Portable Information Terminal)

The portable information terminal 200 (second control unit) is configured to be mutually communicable with the control unit 30 by wireless communication. The portable information terminal 200 functions to acquire an image, which should be displayed in the display unit 10, and transmit an acquired image to the control unit 30. The portable information terminal 200 constructs an HMD system by being organically combined with the HMD 100.

Although the portable information terminal 200 is carried by the user U who wears the display unit 10 and constituted of an information processing apparatus such as a personal computer (PC), a smartphone, a cellular phone, a tablet PC, and a personal digital assistant (PDA), the portable information terminal 200 may be a terminal apparatus dedicated to the HMD 100.

As shown in FIG. 3, the portable information terminal 200 includes a CPU 201, a memory 202, a transmitter/receiver 203, an internal power source 204, a display unit 205, a camera 206, and a position information acquisition unit 207.

The CPU 201 controls the operation of the entire portable information terminal 200. The memory 202 includes a ROM, a RAM, and the like and stores programs and various parameters for controlling the portable information terminal 200 by the CPU 201, an image (object) to be transmitted to the control unit 30, and other necessary data. The internal power source 204 supplies a power necessary for driving the portable information terminal 200.

The transmitter/receiver 203 communicates with a server N, the control unit 30, and another adjacent portable information terminal or the like, using wireless LAN (IEEE802.11 or the like) such as wireless fidelity (WiFi) and a 3G or 4G network for portable communication. The portable information terminal 200 downloads, from the server N via the transmitter/receiver 203, images (objects), which should be transmitted to the control unit 30, and applications for displaying them and stores them in the memory 202.

The server N is typically constituted of a computer including a CPU, a memory, and the like and transmits predetermined information to the portable information terminal 200 in response to a request of the user U or automatically irrespective of the intention of the user U.

The display unit 205 is constituted of, for example, LCD or OLED and displays various menus, GUIs of applications, or the like. Typically, the display unit 205 is integrated with a touch panel and can receive a touch operation of the user. The portable information terminal 200 can be configured to be capable of inputting a predetermined operation signal to the control unit 30 by a touch operation of the display unit 205.

The position information acquisition unit 207 typically includes a global positioning system (GPS) receiver. The portable information terminal 200 is configured to be capable of measuring a current position of the user U (display unit 10) using the position information acquisition unit 207 and acquiring images (objects) necessary from the server N. That is, the server N acquires information on a current position of the user and transmits image data, application software, and the like corresponding to the position information to the portable information terminal 200.

(Details of Control Unit)

Next, the control unit 30 will be described in details.

Figure 4:
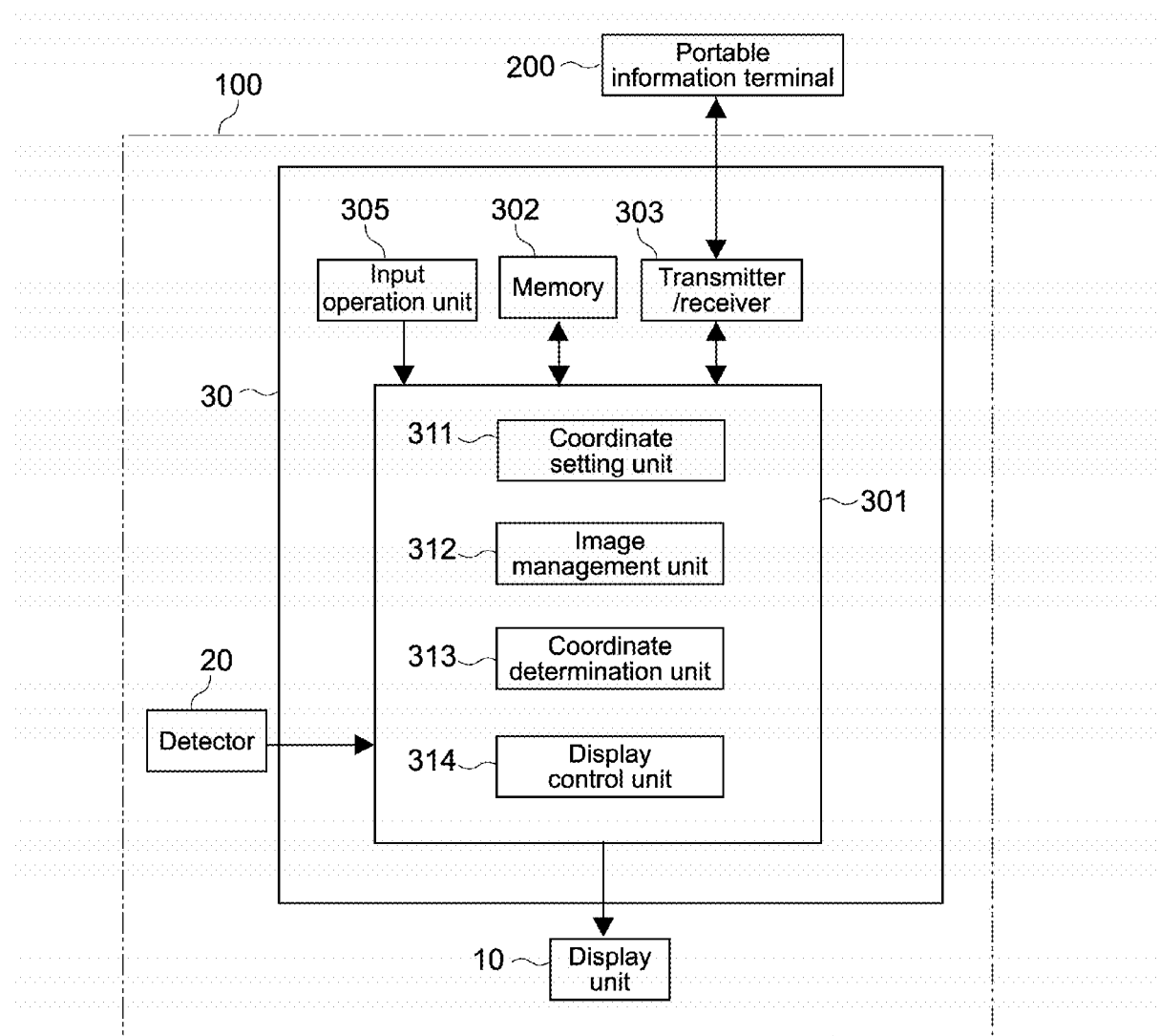
FIG. 4 A function block diagram of a control unit in the head-mounted display.

FIG. 4 is a function block diagram of the CPU 301. The CPU 301 includes a coordinate setting unit 311, an image management unit 312, a coordinate determination unit 313, and a display control unit 314. The CPU 301 executes processes in the coordinate setting unit 311, the image management unit 312, the coordinate determination unit 313, and the display control unit 314 according to the programs stored in the memory 302.

The coordinate setting unit 311 is configured to execute a process of setting three-dimensional coordinates surrounding the user U (display unit 10). In this example, the cylindrical coordinates C0 (see FIG. 1) with a vertical axis Az being a center are used as the three-dimensional coordinates. The coordinate setting unit 311 sets the radius R and the height H of the cylindrical coordinates C0. The coordinate setting unit 311 typically sets the radius R and the height H of the cylindrical coordinates C0 depending on the number and kinds of objects that should be presented to the user U.

Although the radius R of the cylindrical coordinates C0 may be a fixed value, the radius R may be a variable value that can be arbitrarily set depending on the size (pixel size) or the like of an image that should be displayed. The height H of the cylindrical coordinates C0 is set to, for example, one to three times larger than a height Hv (see FIG. 1) of the field of view V in a vertical direction (perpendicular direction), which should be provided to the user U by the display unit 10. An upper limit of the height H is not limited to be three times larger than Hv and may be three or more times larger than Hv.

Figure 5A:
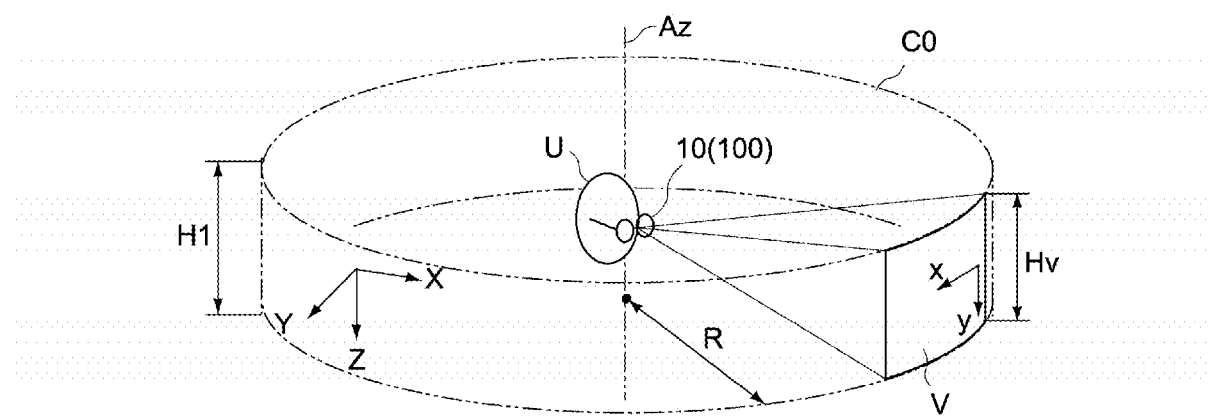
FIG. 5A A schematic view showing cylindrical coordinates as an example of a world coordinate system in the head-mounted display.
Figure 5B:
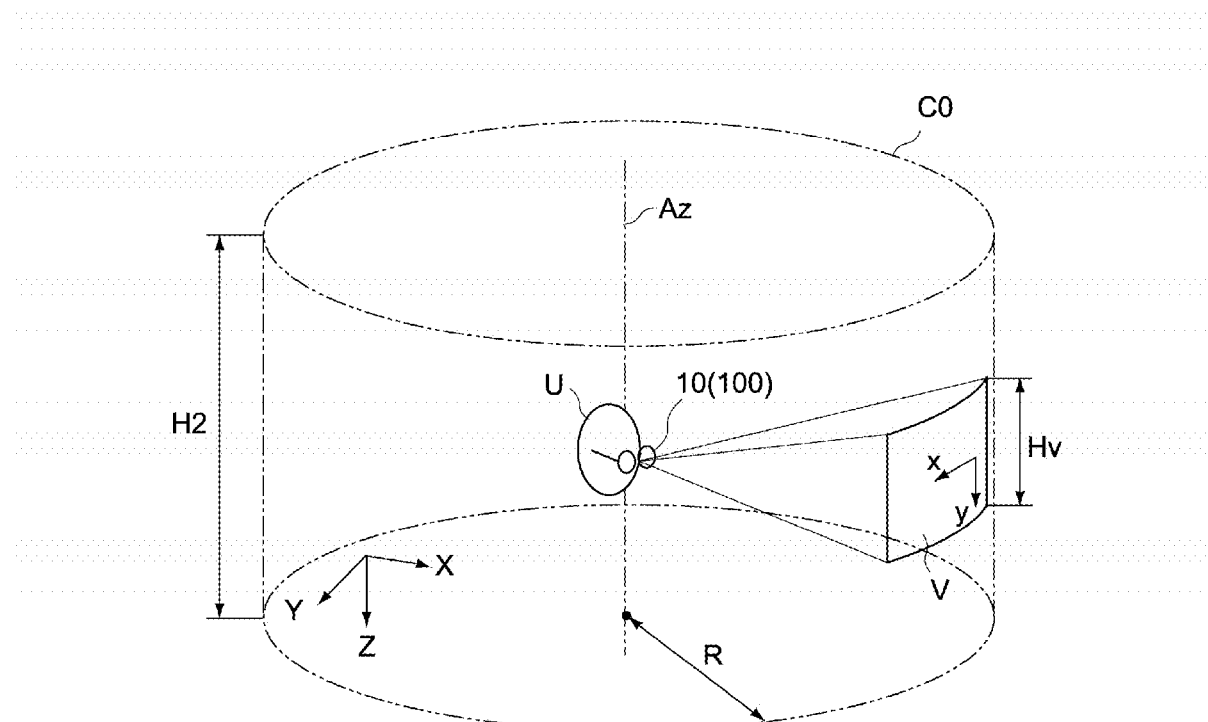
FIG. 5B A schematic view showing cylindrical coordinates as an example of the world coordinate system in the head-mounted display.

FIG. 5A shows cylindrical coordinates C0 having a height H1 equal to the height Hv of the field of view V. FIG. 5B shows cylindrical coordinates C0 having a height H2 three times larger than the height Hv of the field of view V.

Figure 6A:
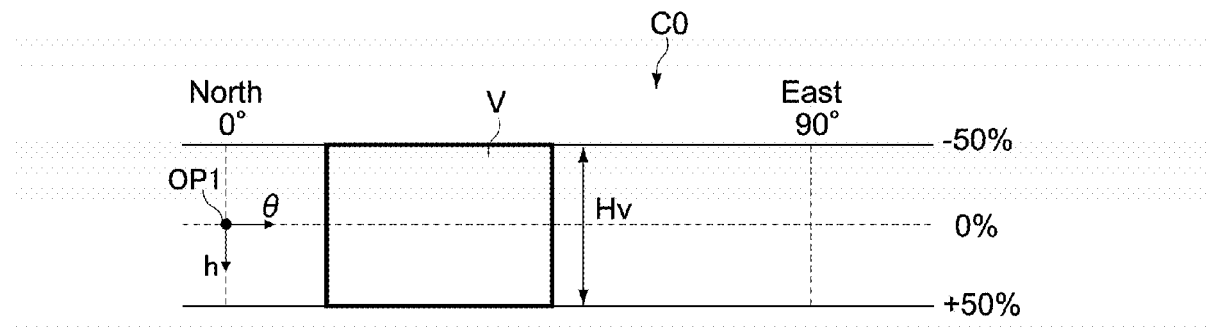
FIG. 6A A development view of the cylindrical coordinates shown in FIG. 5A.
Figure 6B:
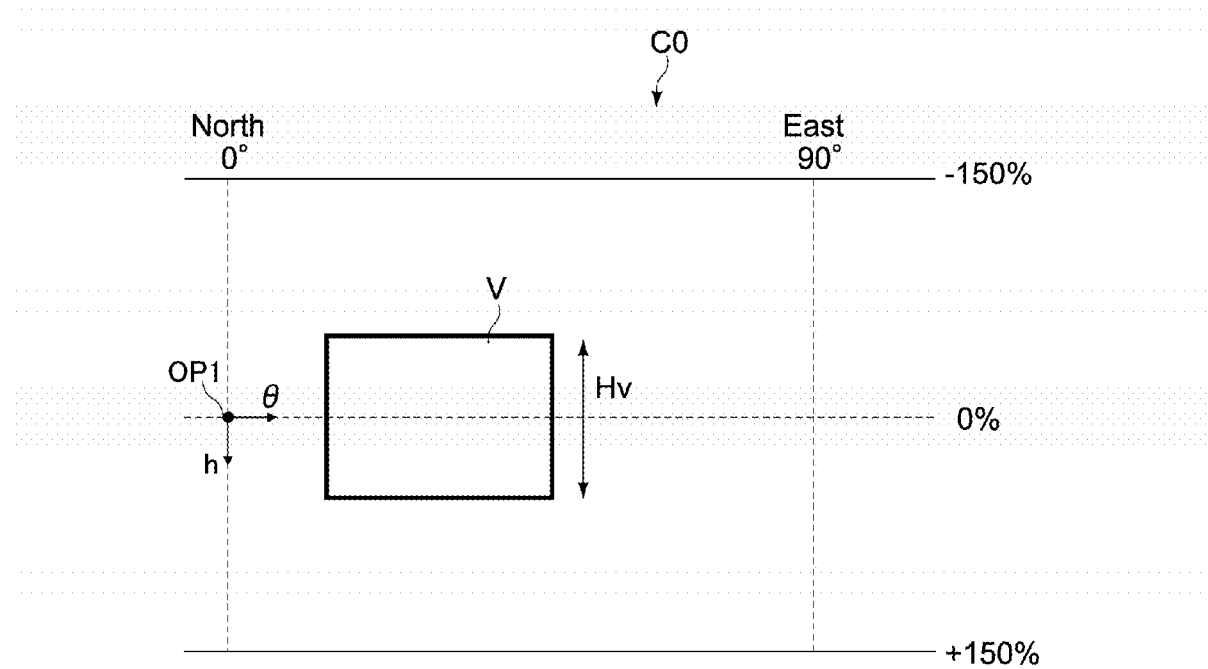
FIG. 6B A development view of the cylindrical coordinates shown in FIG. 5B.

FIGS. 6A and 6B are schematic views showing cylindrical coordinates C0 in a developed state. As described above, the cylindrical coordinates C0 include a coordinate axis (θ) in the circumferential direction showing an angle around the vertical axis with the north direction being 0° and a coordinate axis (h) in the height direction showing an angle in the upper and lower directions with the horizontal line of sight Lh of the user U being a reference. The coordinate axis (θ) has the positive direction from the west to the east and the coordinate axis (h) uses the angle of depression as the positive direction and the angle of elevation as the negative direction. A height h indicates a magnitude when the magnitude of the height Hv of the field of view V is set to 100%. An origin OP1 of the cylindrical coordinates C0 is set to an intersection point of an azimuth (0°) in the north direction and a horizontal line of sight Lh (h=0%) of the user U.

The coordinate setting unit 311 functions as a region limiter capable of limiting a display region of the field of view V along a direction of the one axis in the three-dimensional coordinates surrounding the display unit 10. In this embodiment, the coordinate setting unit 311 limits a field-of-view region (Hv) of the field of view V in the height direction in the cylindrical coordinates C0 surrounding the display unit 10. Specifically, the coordinate setting unit 311 limits, when the specified value of the height (H) is larger than the height Hv of the field of view V, the height (H) of the cylindrical coordinates in a region of the field of view V in the height direction. In addition, the coordinate setting unit 311 limits, for example, the height of the cylindrical coordinates from H2 (FIG. 5B) to H1 (FIG. 5A) according to an operation of the user U.

The image management unit 312 functions to manage images stored in the memory 302. For example, the image management unit 312 is configured to execute a process of storing one or more images, which are displayed via the display unit 10, in the memory 302, and selectively removing the images stored in the memory 302. The images stored in the memory 302 are transmitted from the portable information terminal 200. The image management unit 312 also requests the portable information terminal 200 to transmit an image via the transmitter/receiver 303.

The memory 302 is configured to be capable of storing one or more images (objects), which should be displayed in the field of view V, with the one or more images (objects) being made corresponding to the cylindrical coordinates C0. That is, the memory 302 stores the respective objects B1 to B4 in the cylindrical coordinates C0 shown in FIG. 1 together with the coordinate positions in the cylindrical coordinates C0.

Figure 7:
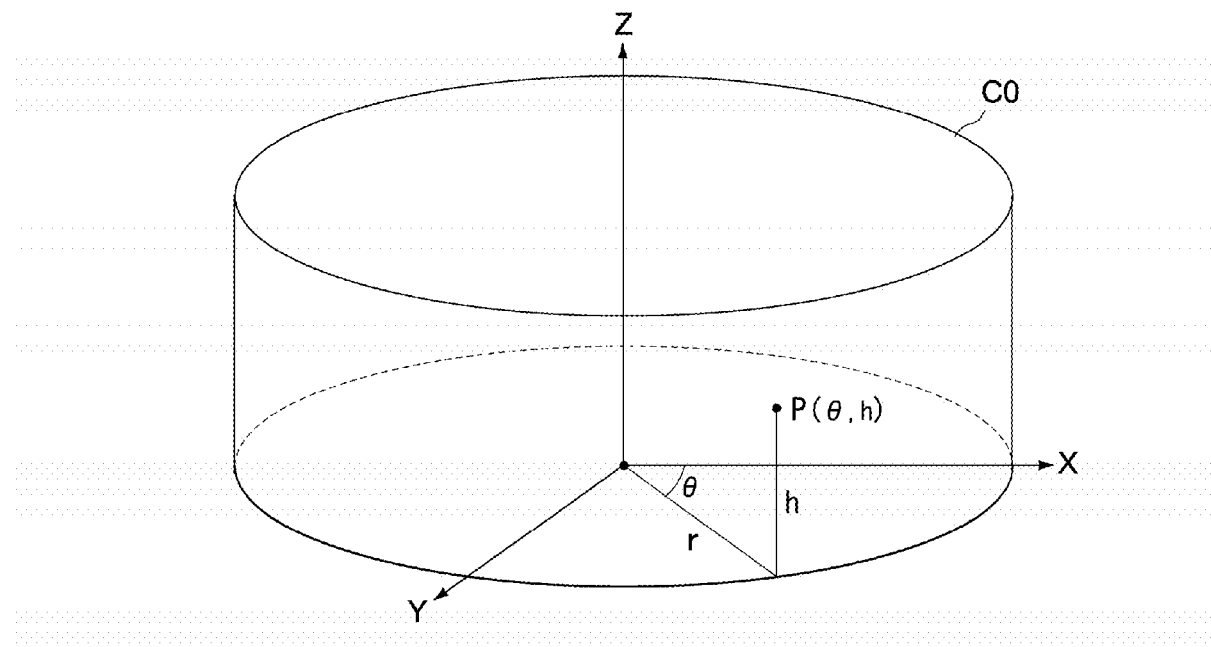
FIG. 7 An explanatory view of a coordinate position in the cylindrical coordinate system.

As shown in FIG. 7, a cylindrical coordinate system (θ, h) and an orthogonal coordinate system (X, Y, Z) have a relationship among X=r cos θ, Y=r sin θ, and Z=h. As shown in FIG. 1, the objects B1 to B4 that should be displayed corresponding to the azimuth or the attitude of the field of view V occupy specific coordinate regions in the cylindrical coordinates C0 and are stored in the memory 302 together with particular coordinate positions P(θ, h) in the region.

The coordinate positions of the objects B1 to B4 may be set at any positions as long as they are within the display region of each of the objects B1 to B4. A particular point (e.g., center position) or two or more points (e.g., two diagonal points or four corner points) may be set per an object.

Further, as shown in FIG. 1, when the coordinate positions of the objects B1 to B4 are made corresponding to intersection positions of the line of sight L of the user who gazes at the targets A1 to A4 and the cylindrical coordinates C0, the user U views the objects B1 to B4 at positions overlapping with the targets A1 to A4. Instead of this, the coordinate positions of the objects B1 to B4 may be made corresponding to any positions spaced apart from the intersection positions. With this, the objects B1 to B4 can be displayed or drawn at desired positions with respect to the targets A1 to A4.

The coordinate determination unit 313 is configured to execute a process of determining, based on the output of the detector 20, which region in the cylindrical coordinates C0 the field of view V of the user U corresponds to. That is, the field of view V is moved in the cylindrical coordinates C0 due to a change in attitude of the user U (display unit 10) and the movement direction and the amount of movement are calculated based on the output of the detector 20. The coordinate determination unit 313 calculates the movement direction and the amount of movement of the display unit 10 based on the output of the detector 20 and determines which region in the cylindrical coordinates C0 the field of view V belongs to.

Figure 8:
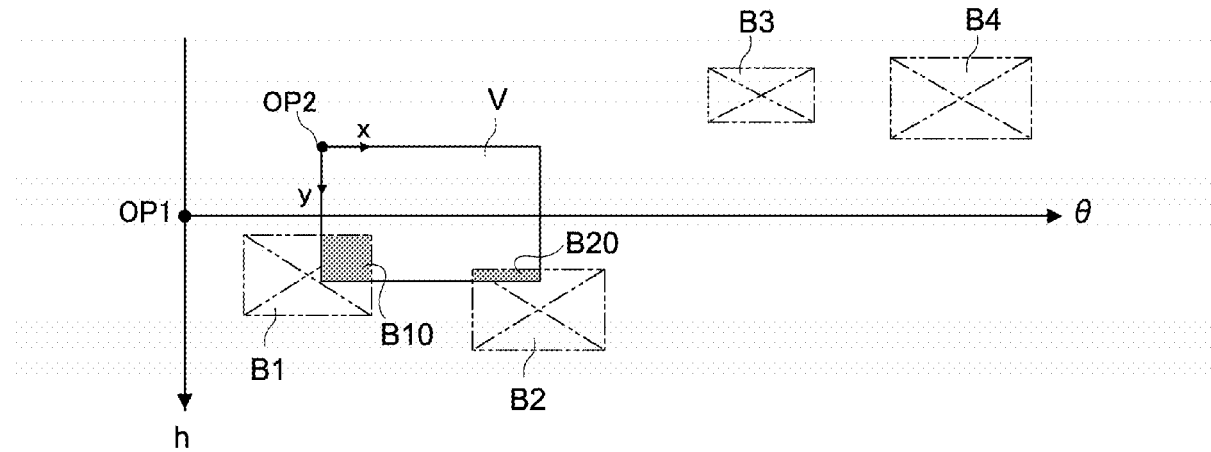
FIG. 8 A development view of the cylindrical coordinates conceptually showing a relationship between a field of view and objects.

FIG. 8 is a development view of the cylindrical coordinates C0 conceptually showing a relationship between the field of view V in the cylindrical coordinates C0 and the objects B1 to B4. The field of view V is almost rectangular and includes xy-coordinates (local coordinates) with an upper left corner being an origin point OP2. The x-axis is an axis extending from the origin point OP2 in the horizontal direction and the y-axis is an axis extending from the origin point OP2 in the perpendicular direction. Then, the coordinate determination unit 313 is configured to execute a process of determining whether or not any of the objects B1 to B4 is present in the corresponding region of the field of view V.

The display control unit 314 is configured to execute a process of displaying (drawing) an object in the cylindrical coordinates C0, which corresponds to the azimuth of the display unit 10, in the field of view V based on the output of the detector 20 (i.e., determination result of coordinate determination unit 313). For example, as shown in FIG. 8, when a current azimuth of the field of view V overlaps with each of the display regions of the objects B1 and B2 in the cylindrical coordinates C0, images corresponding to overlapping regions B10 and B20 thereof are displayed in the field of view V (local rendering).

Figure 9A:
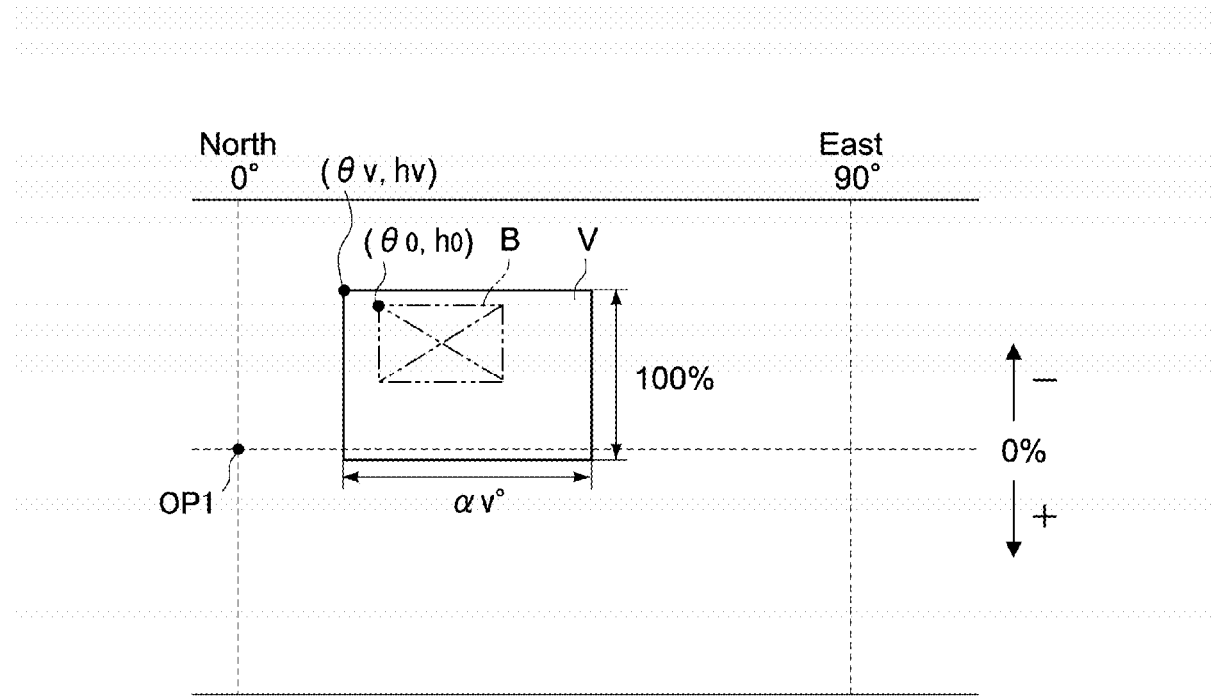
FIG. 9A A view for describing a method of converting cylindrical coordinates (world coordinates) into a field of view (local coordinates).
Figure 9B:
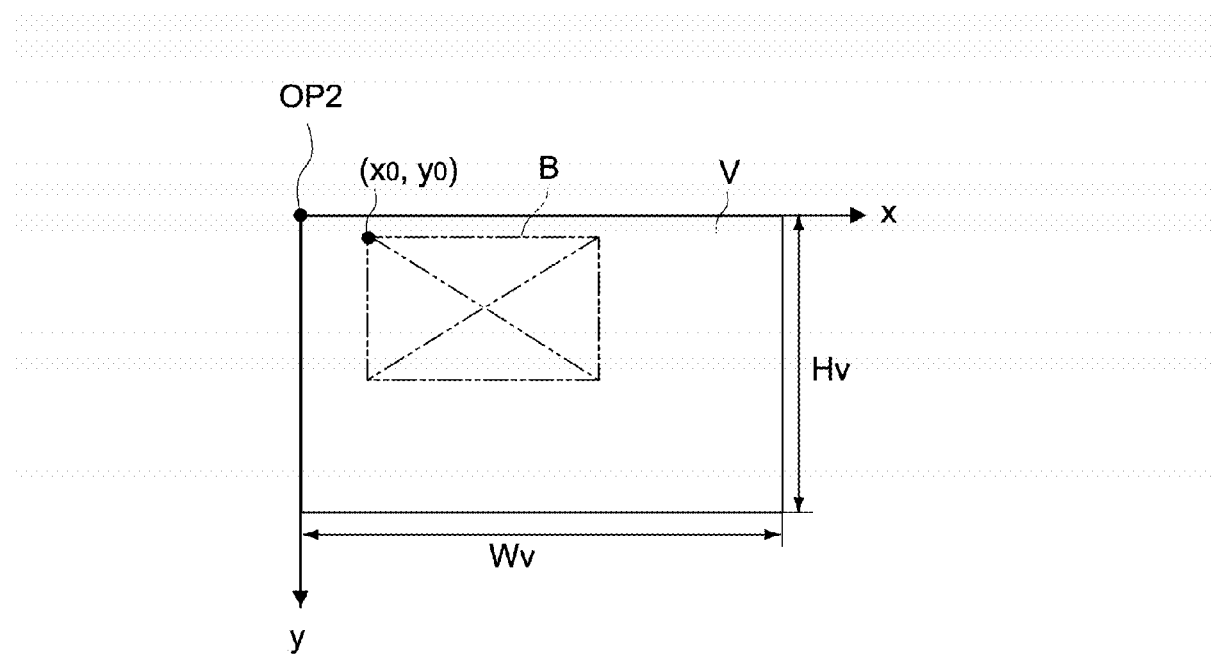
FIG. 9B A view for describing a method of converting cylindrical coordinates (world coordinates) into a field of view (local coordinates).

FIGS. 9A and 9B are views for describing a method of converting the cylindrical coordinates C0 (world coordinates) into the field of view V (local coordinates).

As shown in FIG. 9A, it is assumed that coordinates of a reference point of the field of view V in the cylindrical coordinates C0 are denoted by (θv, hv) and coordinates of a reference point of an object B located in a region of the field of view V are denoted by (θ0, h0). The reference points of the field of view V and the object B may be set to any points. In this example, the reference points are set to upper left corners of the field of view V and the object B each of which has a rectangular shape. αv[°] is a width angle of the field of view V in the world coordinates and the value is determined depending on the design or specification of the display unit 10.

The display control unit 314 converts the cylindrical coordinate system (θ, h) into a local coordinate system (x, y), to thereby determine a display position of the object B in the field of view V. As shown in FIG. 9B, assuming that the height and width of the field of view V in the local coordinate system are denoted by Hv and Wv respectively and the coordinates of the reference point of the object B in the local coordinate system (x, y) are denoted by (x0, y0), the conversion expression is as follows.

$$x0=(\theta 0-\theta v)*Wv/\alpha v \quad (1)$$

$$y0=(h0-hv)*Hv/100 \quad (2)$$

The display control unit 314 typically changes the display position of the object B in the field of view V following the change in azimuth or attitude of the display unit 10. This control is continued as long as at least part of the object B is present in the field of view V.

However, the display region tends to be narrower due to downsizing of the HMD in recent years. Further, in the see-through-type head-mounted display, there is, for example, a case where it is desirable to limit the information display region while ensuring the see-through region. In such a case, when the display position of the object B is changed in the field of view V following the change in azimuth or attitude of the display unit 10 as described above, there is a fear that it becomes difficult to keep the object B in the field of view V. In order to solve such a problem, the HMD 100 according to this embodiment has an object display fixing function as described below.

<Object Display Fixing Function>

(1) Introduction of Non Strict Attribute

The display control unit 314 is configured to be capable of executing a process of moving the object in the field of view V in accordance with the change in azimuth or attitude when the azimuth or the attitude of the display unit 10 is changed by a predetermined angle or larger, and fixing the display position of the object in the field of view V when the change in azimuth or attitude is smaller than the predetermined angle.

In this embodiment, a non-strict attribute may be introduced into the object. That is, if the object B is not fixed at one position of the world coordinate system (cylindrical coordinates C0) and the direction of the eyes of the user U falls within a certain angle range, the object may be fixed and displayed at the local coordinate system (x, y) of the display unit 10. By executing such a process, it is possible to easily keep the state in which the object is in the field of view V. Thus, the movement of the object due to an unintended change in attitude of the user U around the vertical axis or the horizontal axis is regulated, and the visibility of the object can be increased.

The predetermined angle may be an angle around the vertical axis (Z-axis), may be an angle around the horizontal axis (X-axis and/or Y-axis), or may be both of them. The value of the predetermined angle can be appropriately set and is, for example, ±15°. The predetermined angle may be the same between an angle (first predetermined angle) around the vertical axis and an angle (second predetermined angle) around the horizontal axis or may be different therebetween.

(2) First Grab Function

The display control unit 314 is configured to be capable of executing a process of moving the object B to a predetermined position in the field of view V when a change in output of the detector 20 is equal to or smaller than a predetermined value over a predetermined time.

In this embodiment, if the output of the detector 20 is not changed over a predetermined time, the probability that the user is referring to the object displayed in the field of view V is high, and hence the visibility of the object may be increased by moving the object to a predetermined position in the field of view V.

The predetermined time is not particularly limited and is, for example, set to about five seconds. Further, the predetermined position is not particularly limited and is, for example, the center or corner of the field of view V or a deviated position that is any one of the upper, lower, left, and right positions. In addition, the object after movement may be displayed in an exaggeration state, for example, an enlarged state.

For example, if a change in output of the detector 20 is not recognized for a predetermined time with the object being at the center of the field of view V, this function may fixedly display the object B at a predetermined position of the local coordinate system (x, y) of the field of view V. In this case, when the output of the detector 20 exceeds a predetermined value, the function of fixedly displaying the object is released. The output value of the detector 20 at this time may be an amount of change in output that corresponds to a change in attitude that is equal to or larger than the predetermined angle of the display unit 10 around the predetermined axis or may be another amount of change in output.

(3) Second Grab Function

When an input of a predetermined signal generated according to an operation of the user U is detected, the display control unit 314 is configured to be capable of executing a process of moving the object to a predetermined position in the field of view V. Also with such a configuration, the visibility of the object can be increased as described above and to control the display of the image in accordance with the intention of the user.

In this process, for example, by adjusting the object to the center of the field of view V and performing a predetermined input operation on the input operation unit 305 or the portable information terminal 200, the object is fixed to the local coordinate system (x, y) of the field of view V. Then, by operating the input operation unit 305 or the like again, the object is restored to the world coordinate system and the function of fixedly displaying the object is released.

(4) Image Stabilization Function

When a change in output of the detector 20 is equal or higher than a predetermined frequency with the object being displayed at a predetermined position in the field of view V, the display control unit 314 is configured to be capable of executing a process of canceling frequency components of the output of the detector 20, which are equal to or higher than the predetermined frequency.

When the object in the field of view V is moved following a change in azimuth or attitude of the display unit 10, there is a fear that it also follows a slight shake of the face of the user U and the visibility of the object is deteriorated. In order to prevent this problem, the object may be prevented from following the change in attitude of the display unit 10 for high frequency components equal to or higher than a predetermined value and the object-displaying position may be fixed in the field of view V (local coordinate system) for low frequency components lower than the predetermined value. For example, the predetermined frequency is set to a frequency corresponding to the shake of the face of the user. With this, it is possible to ensure the visibility of the image without receiving the influence of the slight shake of the face of the user.

Figure 10A:
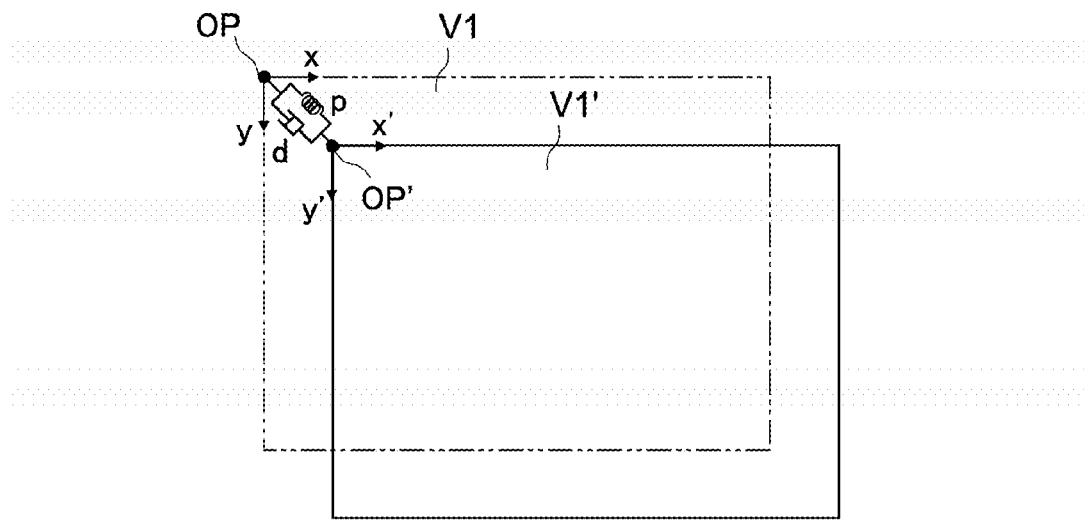
FIG. 10A A conceptual diagram for describing an image stabilization function in the head-mounted display.
Figure 10B:
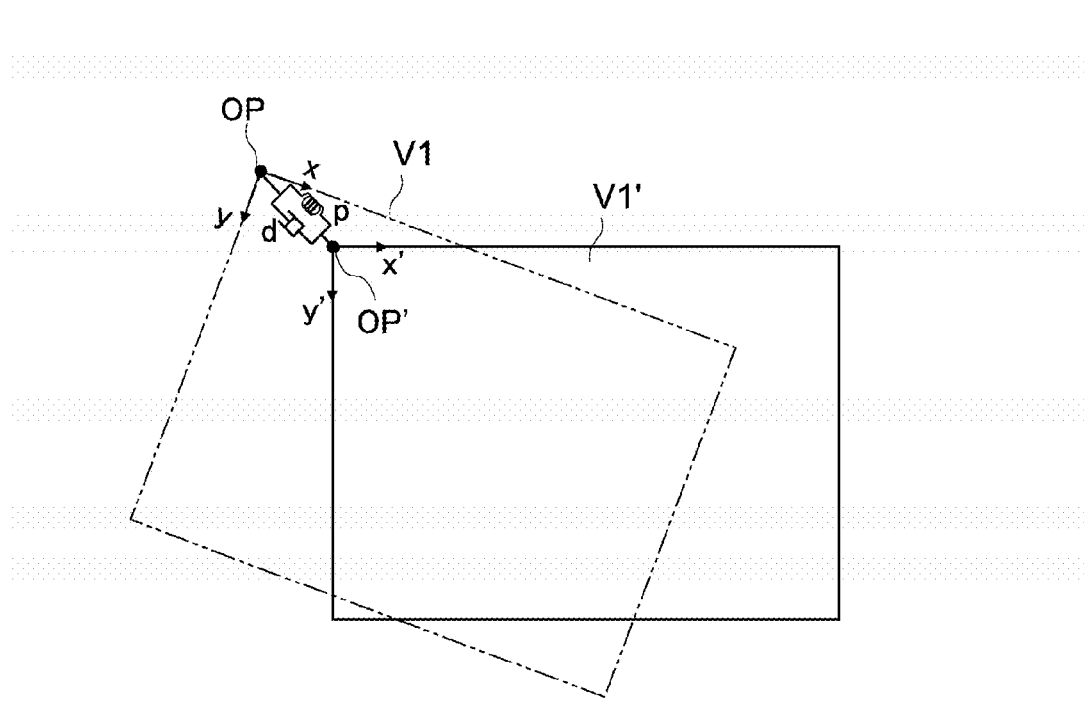
FIG. 10B A conceptual diagram for describing the image stabilization function in the head-mounted display.

FIGS. 10A and 10B are conceptual diagrams for describing the image stabilization function. In the figures, V1 denotes a local coordinate system at a certain point of time and V2 denotes an image stabilization coordinate system corresponding to V1. OP and OP' show origins of V1 and V2.

When the image stabilization function is enabled, the object is placed in the image stabilization coordinate system. The image stabilization coordinate system is subjected to follow-up control with respect to the local coordinate system (x, y) of the field of view V by PD control. The PD control is one of kinds of feed back control and generally refers to a control of converging to a setting value by combining a proportional control and a differential control. In FIGS. 10A and 10B, regarding a spring (p) and a damper (d) each connected between the field of view V and a field of view V', the spring (p) corresponds to a P component of the PD control and the damper (d) corresponds to a D component of the PD control.

As an example of a method of calculating the follow-up control, it is assumed that a point in the local coordinate system V1 at a certain point t is denoted by (x(t), y(t)) and a point in the image stabilization coordinate system V2 corresponding thereto is denoted by (x'(t), y'(t)). In addition, a point of a local coordinate system V1 before a sampling period ($\Delta t$) is denoted by (x(t−$\Delta t$), y(t−$\Delta t$)) and a point of an image stabilization coordinate system V2 corresponding thereto is denoted by (x'(t−$\Delta t$), y'(t−$\Delta t$)). Assuming that a difference between corresponding points is denoted by ($\Delta x(t)$, $\Delta y(t)$), it is expressed as follows.

$$\Delta x(t) = x'(t) - x(t) \tag{3}$$

$$\Delta y(t) = y'(t) - y(t) \tag{4}$$

Assuming that a speed difference between corresponding points is denoted by ($\Delta vx(t)$, $\Delta vy(t)$), it is expressed as follows.

$$\Delta vx(t) = \{\Delta x'(t) - \Delta x'(t - \Delta t)\} - \{\Delta x(t) - \Delta x(t - \Delta t)\} \tag{5}$$

$$\Delta vy(t) = \{\Delta y'(t) - \Delta y'(t - \Delta t)\} - \{\Delta y(t) - \Delta y(t - \Delta t)\} \tag{6}$$

An amount ($\Delta p(t)$, $\Delta q(t)$) by which the image stabilization coordinate system V1' should be moved following the local coordinate system V1 at that time is expressed.

$$\Delta p(t) = Px \times \Delta x(t) + Dx \times \Delta vx(t) \tag{7}$$

$$\Delta q(t) = Py \times \Delta y(t) + Dy \times \Delta vy(t) \tag{8}$$

Where Px and Py are difference gain constants for x and y and Dx and Dy are speed gain constants for x and y.

Even if the local coordinate system V1 is rotated, the image stabilization coordinate system V1' does not follow a rotational component (FIG. 10B). That is, even if the user tilts the face around an axis in front and back directions of the user, a tilt of the object is regulated.

The above-mentioned object display fixing functions (1) to (4) may be individually applied or may be appropriately combined and applied. For example, a combination of any one of (1) to (3) above with (4) above is applicable.

<Region-Limiting Function>

Next, a region-limiting function of the HMD 100 will be described.

In recent years, in a see-through-type head-mounted display, there is, for example, a case where it is desirable to limit an information display region while ensuring a see-through region. In this case, there is a fear that it is difficult for the object image to enter the field of view. Therefore, in this embodiment, for the purpose of increasing the searchability of the object, the region-limiting function of the world coordinate system is provided.

As described above, the coordinate setting unit 311 functions as the region limiter capable of limiting a region (H) along the Z-axis direction in the cylindrical coordinates C0 surrounding the display unit 10 in accordance with a region (Hv) in the height direction of the field of view V (see FIG. 5A). By limiting the height H of the cylindrical coordinates C0, it is possible to increase the searchability and the visibility of the image in a horizontal field of view of the user.

A limiting amount of the cylindrical coordinates C0 in the height direction is not particularly limited. In this embodiment, the height of the cylindrical coordinates C0 is limited to a height (H1) equal to the height Hv of the field of view V. If the region-limiting function is enabled, the display control unit 314 is configured to be capable of changing at least the h coordinate of the cylindrical coordinate system (θ, h) and displaying the objects B1 to B4 in the field of view V such that the objects B1 to B4 are located in the cylindrical coordinates C0 whose region is limited.

Figure 11A:
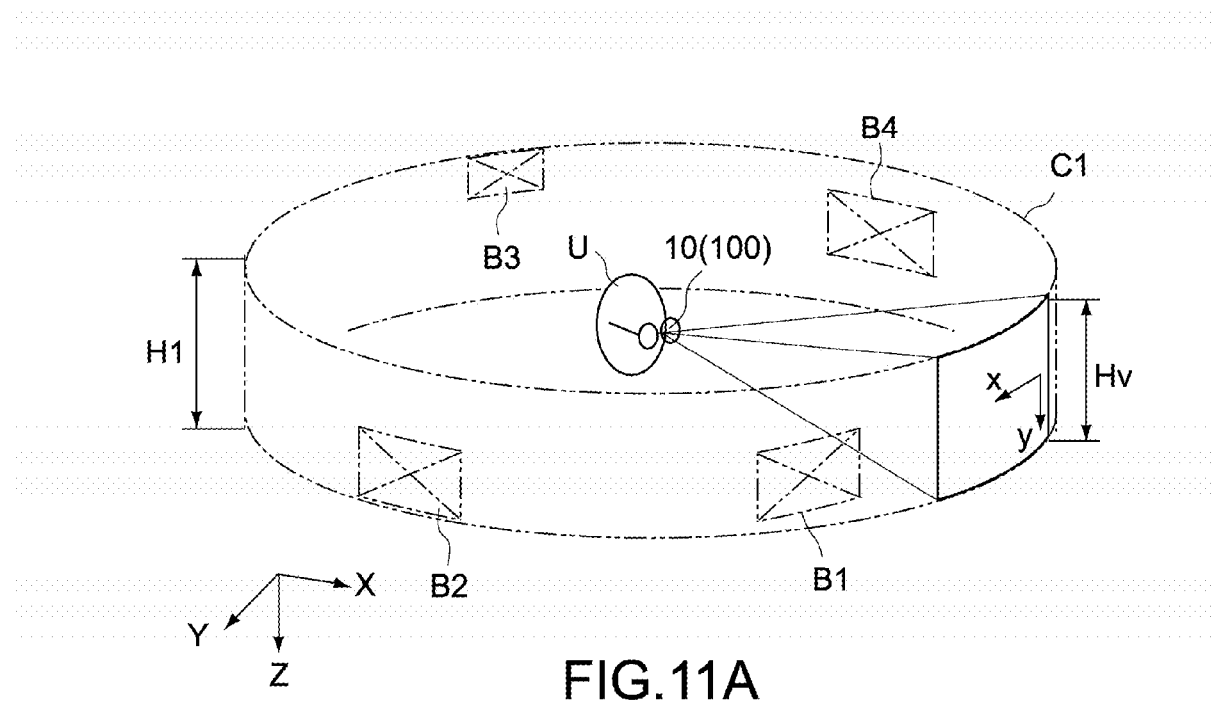
FIG. 11A A schematic view showing a relative position relationship between objects made corresponding to cylindrical coordinates whose region is limited and the field of view.
Figure 11B:
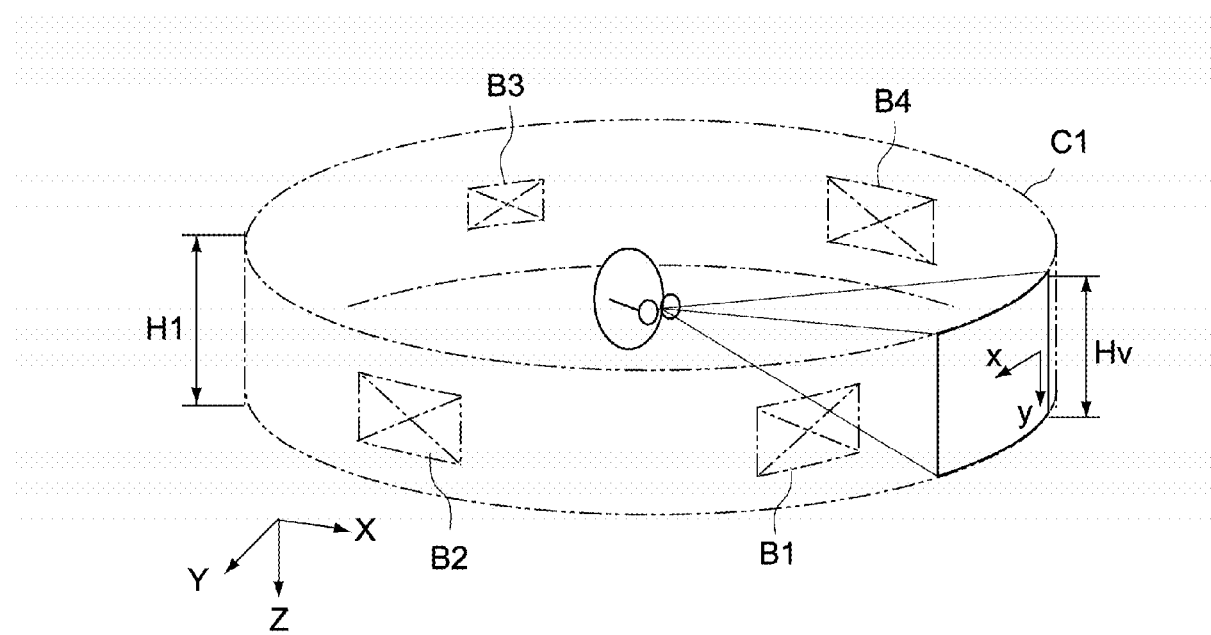
FIG. 11B A schematic view showing a relative position relationship between objects made corresponding to the cylindrical coordinates whose region is limited and the field of view.

FIGS. 11A and 11B are schematic views showing a relative position relationship between the objects B1 to B4 made corresponding to cylindrical coordinates C1 whose region is limited to the height H1 and the field of view V. The user U can view the objects B1 to B4 made corresponding to all azimuths only by changing the attitude around the Z-axis (vertical axis), and hence the searchability of the objects B1 to B4 is dramatically increased.

Although all the objects B1 to B4 are located in the cylindrical coordinates C1 in the example of FIG. 11A, it is not limited thereto, and at least an object may be located in the cylindrical coordinates C1 depending on the needs. Further, the heights of the objects B1 to B4 located in the cylindrical coordinates C1 are not particularly limited and each of the heights can be appropriately set.

In addition, although the entire objects B1 to B4 are located in the cylindrical coordinates C1 in the example of FIG. 11, at least part of the objects B1 to B4 may be displayed in the field of view V. With this, it is possible to easily recognize the image present at a certain azimuth. In this case, the height H1 of the cylindrical coordinates C1 may be variable to a larger height according to an input operation by the user U on the input operation unit 305 or the like. With this, the entire object can be viewed.

Whether to enable or disable the above-mentioned region-limiting function may be selectable according to settings by the user U. In the HMD 100 according to this embodiment, the region-limiting function using the world coordinate system as the cylindrical coordinates C1 is set in an enabled state as a normal mode. The change of the region-limiting function (e.g., change in height H) or switching to a disabled state can be performed according to a spontaneous setting change by the user.

On the other hand, when detecting an input of a predetermined signal generated according to an operation of the user U, the control unit 30 may be configured to be capable of executing a process of limiting a region in the height direction in the cylindrical coordinates to the region (Hv) in the height direction of the field of view V and aligning all the objects displayed in the field of view V at the same height in the field of view V.

That is, if the region-limiting function is in an enabled state or if the world coordinate system is set in the cylindrical coordinates other than the cylindrical coordinates C1, the world coordinate system is forcedly switched to the cylindrical coordinates C1 according to an input operation by the user U on the input operation unit 305 or the like. In addition, the objects B1 to B4 are located at positions in the cylindrical coordinates C1 such that all the objects B1 to B4 are displayed at the same height in the field of view V as shown in FIG. 11B. With this, it is possible to further enhance the visibility of the image displayed in the field of view.

<Image Management Function>

Next, the image management function of the HMD 100 will be described.

As described above, in this embodiment, the portable information terminal 200 is used for transmitting object data to the control unit 30. The portable information terminal 200 includes the position information acquisition unit 207 that measures a position of the user U (display unit 10) and an image acquisition unit including the transmitter/receiver 203 or the like that is capable of acquiring the plurality of objects (B1 to B4), which should be stored in the memory 302 of the control unit 30, from the server N or the like.

In this embodiment, the control unit 30 requests the portable information terminal 200 to transmit one or more object data items selected from among the plurality of object data items. Then, the portable information terminal 200 transmits the requested object data to the control unit 30.

For smoothly drawing the objects in the field of view V of the display unit 10, a communication speed between the portable information terminal 200 and the control unit 30 and latency (time from issue of transmission request to actual transmission of image) becomes problematic. In this embodiment, for the purpose of avoiding the problems of the communication speed and the latency, the control unit 30 (in this example, image management unit 312) is configured as follows.

First, the control unit 30 is configured to acquire a plurality of object data items necessary from the portable information terminal 200 in advance. With this, the drawing timing of the objects in the field of view V can be controlled at the control unit 30. It becomes possible to provide the necessary objects to the user U at suitable timing irrespective of the communication environment and the like.

Further, the control unit 30 is configured to request the portable information terminal 200 to preferentially transmit the objects made corresponding to coordinate positions closer to the display region of the field of view V in the cylindrical coordinates C0. By preferentially acquiring object data having high probability of being presented to the field of view V in this manner, it is possible to avoid the delay of the object display in the field of view V.

At this time, the image management unit 312 is configured to be capable of executing a process of first setting one or more frames corresponding to arrangement positions of the objects in the world coordinates and then arranging an object with a high priority in the frame. Note that "arrange the frame or object in the world coordinates" means making the frame or object corresponding to the world coordinates.

Figure 12A:
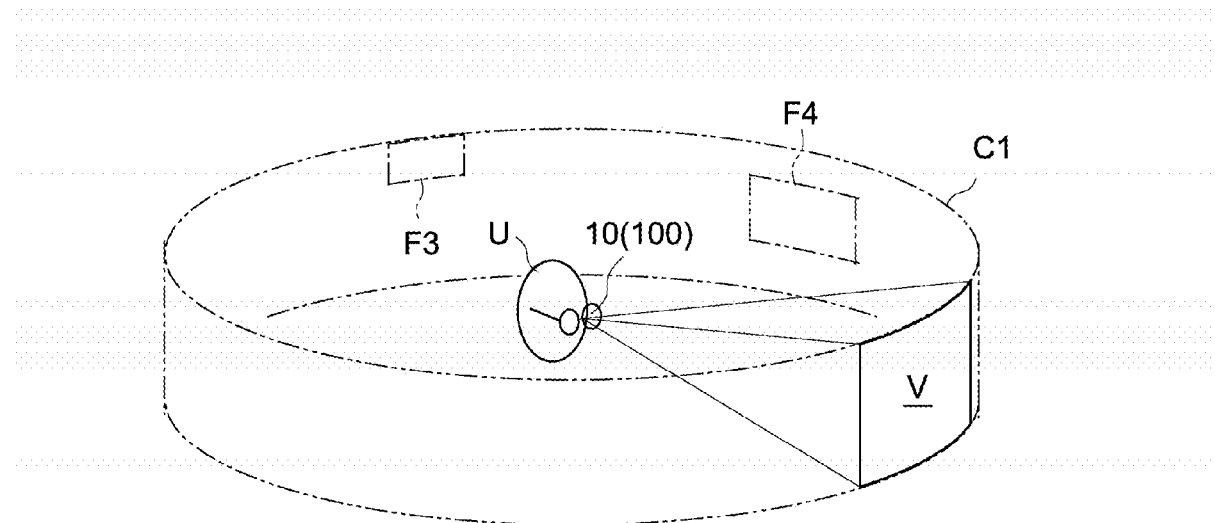
FIG. 12A A conceptual diagram for describing a procedure of arranging objects in the cylindrical coordinates whose region is limited.
Figure 12B:
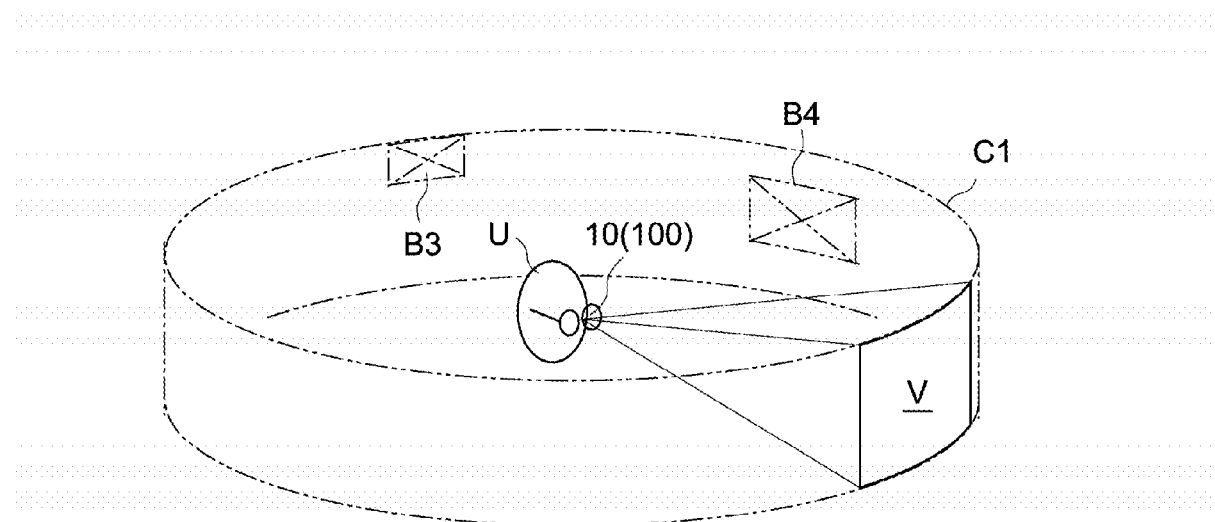
FIG. 12B A conceptual diagram for describing a procedure of arranging objects in the cylindrical coordinates whose region is limited.
Figure 13:
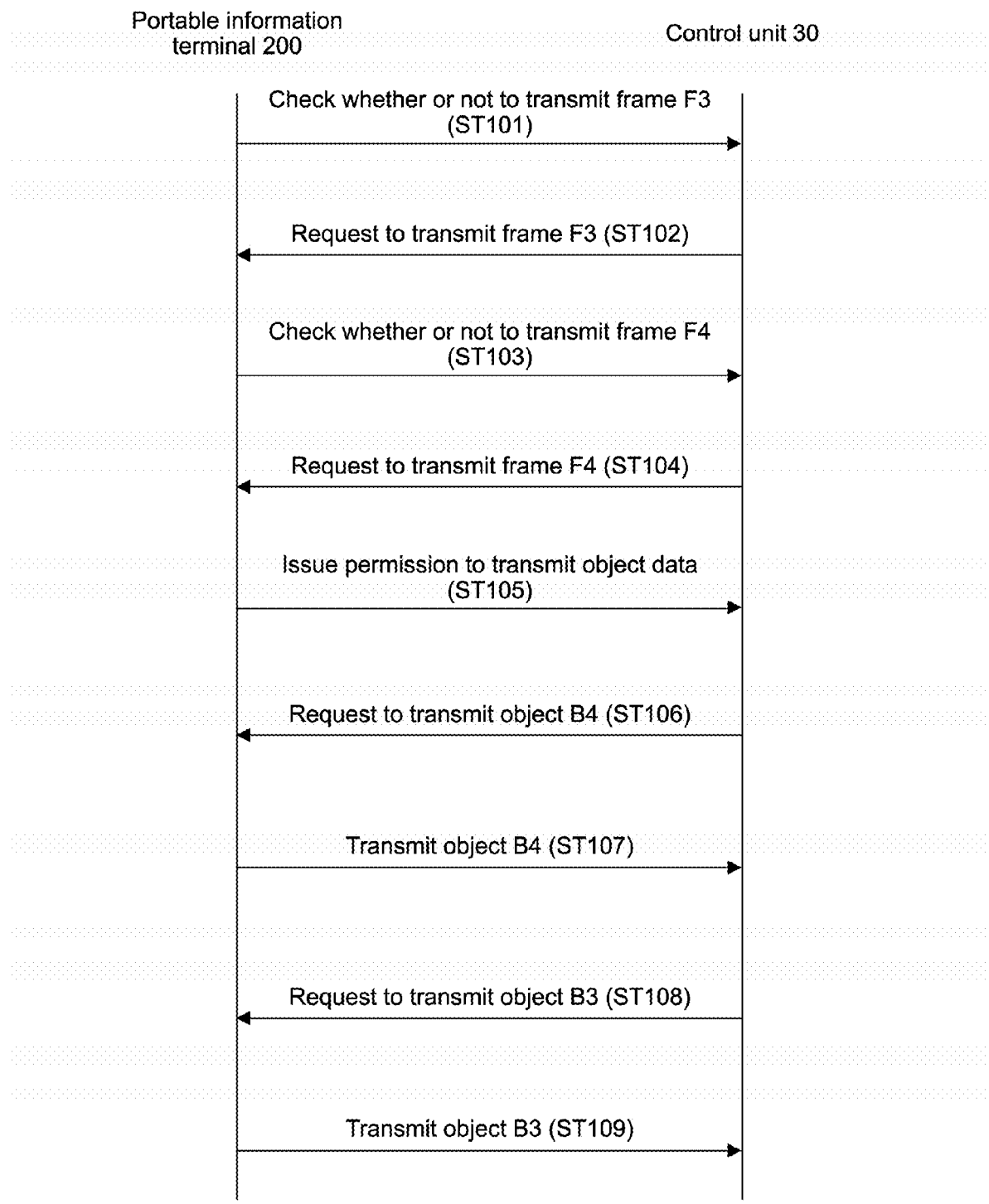
FIG. 13 A sequence diagram for describing a procedure of arranging the objects in the cylindrical coordinates whose region is limited.

As an example, FIGS. 12A, 12B, and 13 show processes of arranging the objects B3 and B4 in the cylindrical coordinates C1 whose region is limited to the height H1. Note that the following processes are applicable also to cylindrical coordinates C0 whose region is not limited or a world coordinate system constituted of other three-dimensional coordinates.

In this embodiment, each of image data items of the objects (object data items) and the frame data items for defining the coordinate positions of the objects is transmitted from the portable information terminal 200 to the control unit 30. The frame data items have an amount of data smaller than that of the object data items, and hence a necessary acquisition time thereof is shorter than that of the object data items. Therefore, a communication for frame data acquisition is first performed and then a communication for object data acquisition is performed in a priority order.

(Frame Registration Phase)

First, the portable information terminal 200 checks whether or not to transmit a frame F3 for arranging the object B3 to the control unit 30 (Step 101). Correspondingly, the control unit 30 requests the portable information terminal 200 to transmit the frame F3 (Step 102). The control unit 30 stores the received frame F3 in the memory 302, to thereby arrange the frame F3 at the corresponding position in the cylindrical coordinates C1.

Next, the portable information terminal 200 checks whether or not to transmit a frame F4 for arranging the object B4 to the control unit 30 (Step 103). Correspondingly, the control unit 30 requests the portable information terminal 200 to transmit the frame F4 (Step 104). The control unit 30 stores the received frame F4 in the memory 302, to thereby arrange the frame F4 at the corresponding position in the cylindrical coordinates C1. After all frame data items are transmitted, the portable information terminal 200 notifies the control unit 30 of a permission to transmit the object data items (Step 105).

(Data Acquisition Phase)

The control unit 30 transitions to a data acquisition phase, using the transmission permission notification of the object data items as a trigger. Specifically, for example, the control unit 30 determines, based on the output of the detector 20, a frame (in this example, frame F4) closest to the azimuth of a current field of view V (display unit 10) and requests to transmit image data of the object (in this example, the object B4) belonging to this frame (Step 106). In response to this request, the portable information terminal 200 transmits the image data of the object B4 to the control unit 30 (Step 107). The control unit 30 stores the received image data of the object B4 in the memory 302 and arranges the object B4 in the frame F4 in the cylindrical coordinates C1.

Next, the control unit 30 determines a frame (in this example, frame F3) that is the second closest to the azimuth of the field of view V next to the frame F4 and requests to transmit the image data of the object (in this example, object B3) belonging to the frame (Step 108). In response to this request, the portable information terminal 200 transmits the image data of the object B3 to the control unit 30 (Step 109). The control unit 30 stores the received image data of the object B3 in the memory 302 and arranges the object B3 in the frame F3 in the cylindrical coordinates C1.

As described above, the control unit 30 is configured to be capable of registering the frame data items of the objects in the cylindrical coordinates C1 in advance such that the acquisition priority of the objects with the current field of view V being a reference can be determined, and to acquire, based on the determination result, image data items sequentially from the object with a high priority (closest to field of view V).

In the case where the object is an animation image, priority setting only needs to be performed in view of a current time and an animation frame time. For example, the control unit 30 is configured to request the portable information terminal 200 to collectively transmit at least some of all images constituting the animation image. Thus, even if the object is the animation image, it is possible to dynamically deal with such a case by cashing a necessary number of images (e.g., images for one second) in view of the frame rate.

For constructing the system as described above, it is necessary to increase the capacity of the memory 302 that retains the object data items. However, by retaining preferentially the object data items with a high necessity and dynamically carrying out a process of discarding data items with a low necessity, suitable object display can be realized even if the data items of all the objects cannot be retained. Note that the discarded data items only needs to be acquired again if necessary.

That is, the control unit 30 may be configured to regularly evaluate, with respect to all the objects stored in the memory 302, distances between the coordinate positions thereof and the display region of the field of view V and remove, from the memory 302, the object at the coordinate position furthest from the display region of the field of view V. Specifically, based on a relative position relationship between each of all the objects in the cylindrical coordinates C1 and the current azimuth of the field of view V, the priorities of all the objects are evaluated and the object data with a low priority is removed. With this, a storage area of the object data close to the field of view V can be ensured.

A method of evaluating a priority is not particularly limited. For example, the priority can be evaluated based on the number of pixels between the center position of the field of view V in the cylindrical coordinates C1 and the center position of the object. Further, in the case of the animation image, the evaluation value may be multiplied by a coefficient based on the reproduction time.

[Operations of HMD]

Next, an example of operations of an HMD system including the thus configured HMD 100 according to this embodiment will be described.

Figure 14:
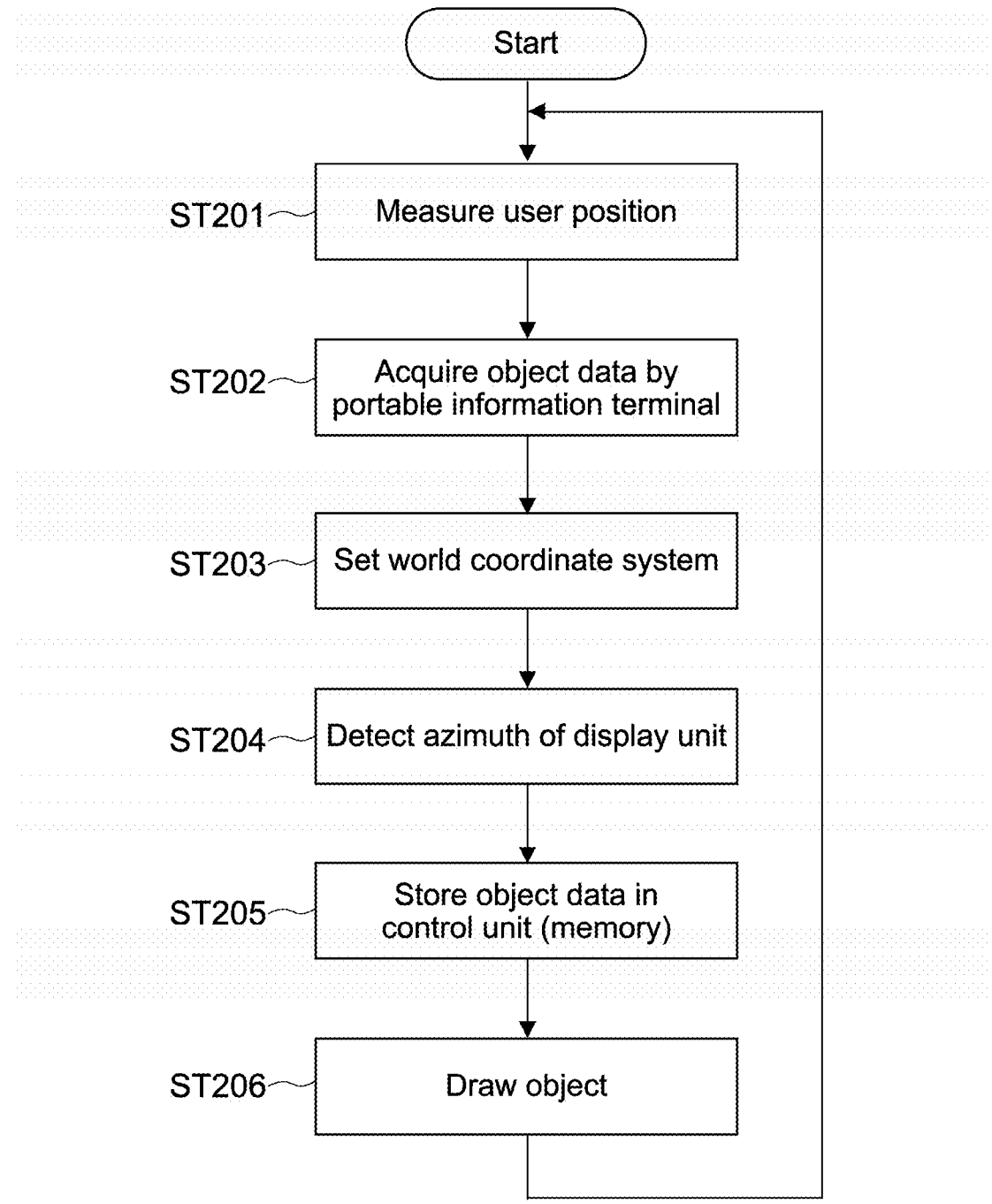
FIG. 14 A flowchart for describing an outline of operations of the system.

FIG. 14 is a flowchart for describing an outline of the operations of the HMD system according to this embodiment.

First, using the position information acquisition unit 207 of the portable information terminal 200, the current position of the user U (display unit 10) is measured (Step 201). The position information of the display unit 10 is transmitted to the server N. Then, the portable information terminal 200 acquires, from the server N, object data relating to a predetermined target present in the real space around the user U (Step 202).

Next, the portable information terminal 200 can issue a notification that the preparation for transmitting the object data to the control unit 30 is complete. The control unit 30 (in this example, coordinate setting unit 311) sets the height (H) and the radius (R) of the cylindrical coordinates C0 serving as the world coordinate system in accordance with the kind of object data and the like (Step 203).

In this case, if the region-limiting function in accordance with the height (Hv) of the field of view V provided by the display unit 10 is enabled, the coordinate setting unit 311 sets the world coordinate system to the cylindrical coordinates C1 shown in FIG. 12A, for example.

Next, the control unit 30 detects the azimuth of the field of view V based on the output of the detector 20 (Step 204). The control unit 30 acquires the object data from the portable information terminal 200 and stores it in the memory 302 (Step 205).

Figure 15:
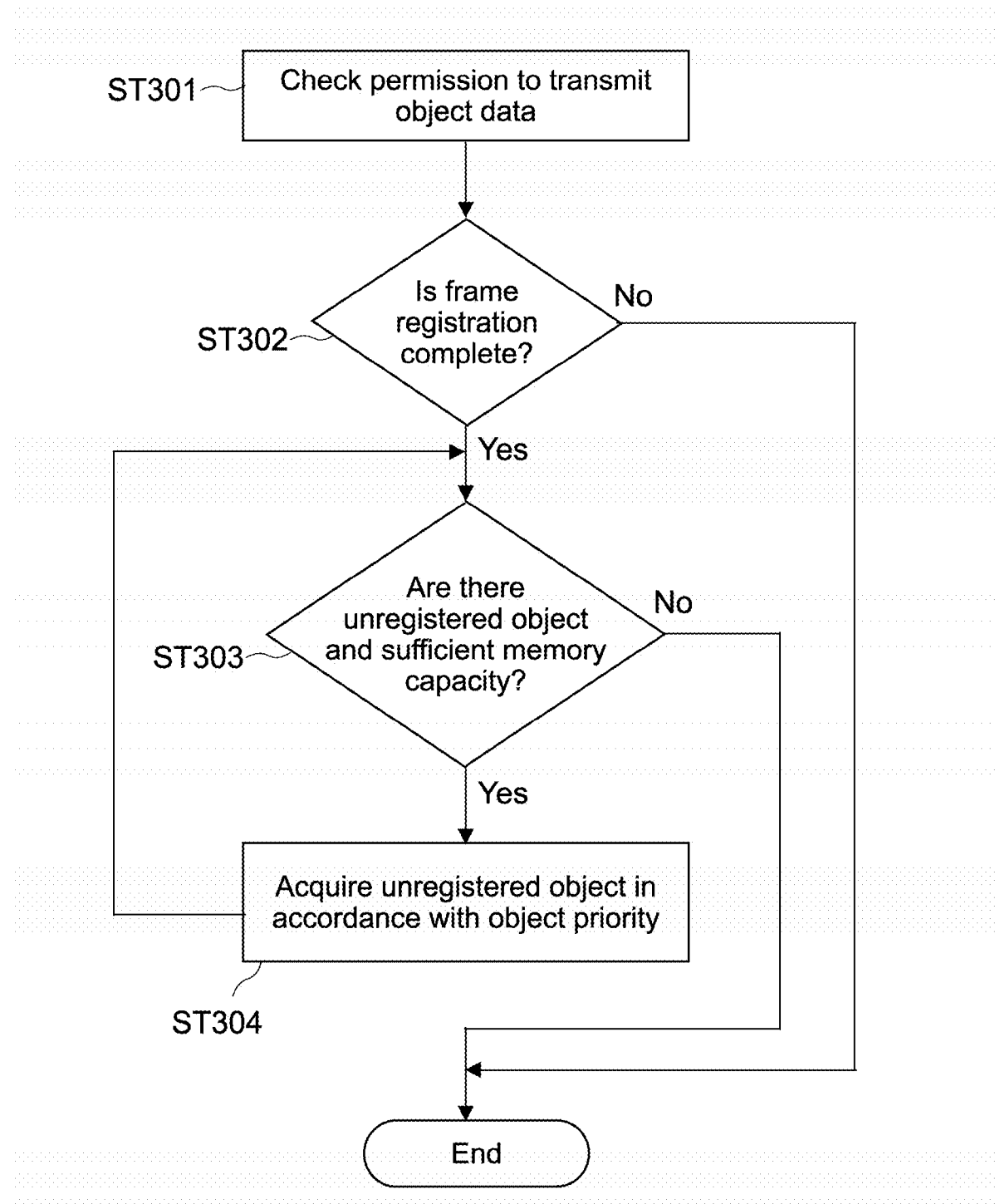
FIG. 15 A flowchart showing an example of a procedure of receiving object data items by the control unit.

FIG. 15 is a flowchart showing an example of a reception process of the object data by the control unit 30.

After receiving a transmission permission check of the object data from the portable information terminal 200 (Step 301), the control unit 30 determines whether or not the frame registration of all the objects is complete (Step 302). That is because the coordinate position of the object is not fixed unless the frame registration of all the objects is not complete and the evaluation of the object priority is impossible. The process is terminated if the frame registration is not complete, and the registration process of the above-mentioned incomplete frame is executed.

Otherwise, if the frame registration of all the objects is complete, the presence and absence of an object not received and the capacity of the memory 302 are checked (Step 303). If there is an unregistered object and the memory capacity are sufficient, the unregistered object is received and stored in the memory 302 (Step 304).

Note that the control unit 30 regularly evaluates the priority of the object in the memory 302 and removes one with a low evaluation value if necessary.

If any object data item is present in the corresponding region of the field of view V in the cylindrical coordinates C0, the control unit 30 displays (draws) this object at the corresponding position in the field of view V via the display unit 10 (Step 206). In displaying the object in the field of view V, any of the above-mentioned object display fixing functions may be applied.

Figure 16:
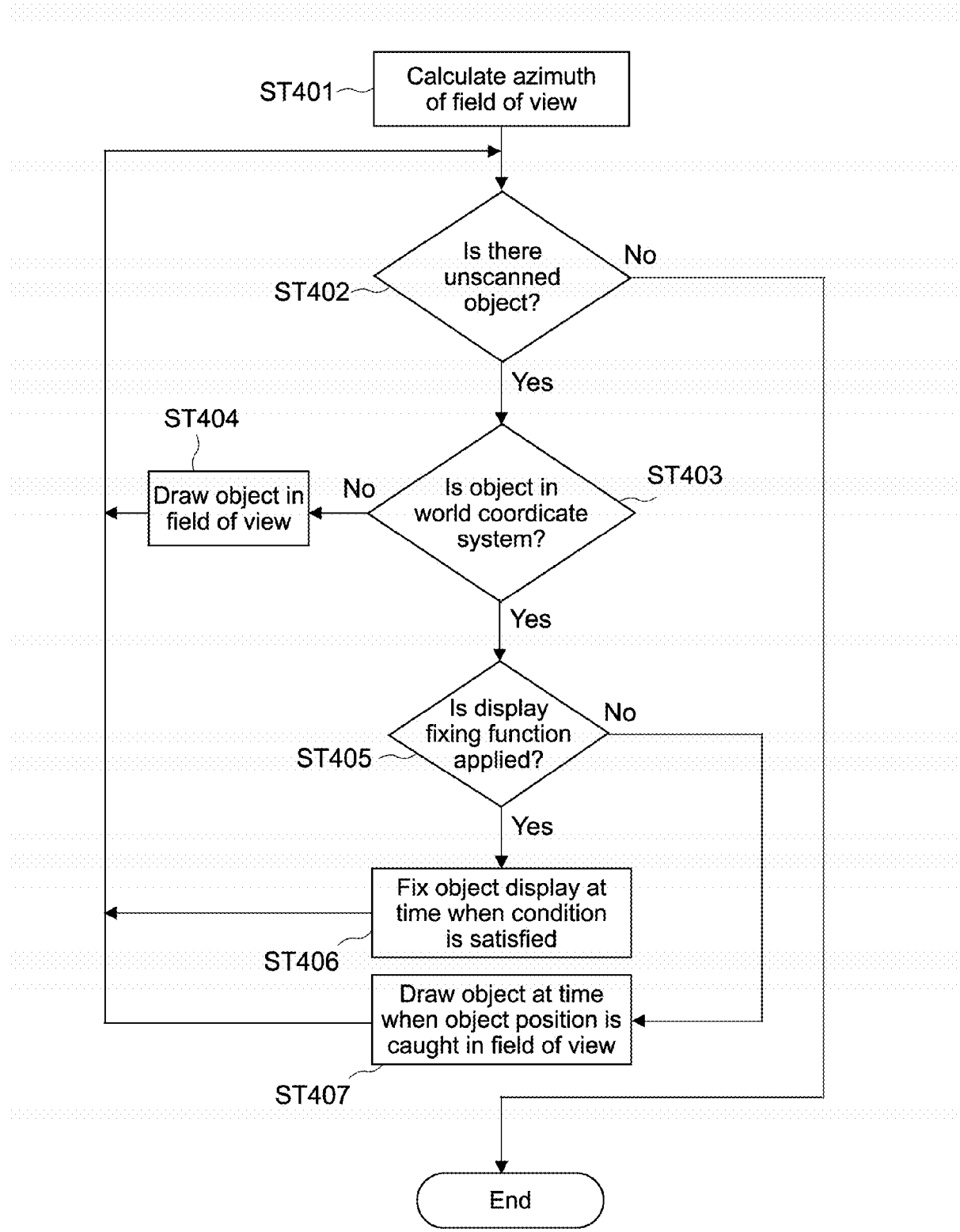
FIG. 16 A flowchart showing an example of a procedure of drawing the objects in the field of view by the control unit.

FIG. 16 is a flowchart showing an example of a drawing procedure of the objects in the field of view V by the control unit 30.

The control unit 30 calculates the azimuth of the current field of view V based on the output of the detector 20 (Step 401). The azimuth of the field of view V is converted into the world coordinate system ($\theta$, h) and which position in the cylindrical coordinates C0 it corresponds to is monitored.

Next, the control unit 30 determines whether or not there is an unscanned object among all the objects stored in the memory 302 (Step 402). The scan is performed on all the objects stored in the memory 302 once per screen update.

If there is an unscanned object, whether or not this object is the object of the world coordinate system is determined (Step 403) and this object is drawn in the field of view V in the case of "No" (Step 404).

Otherwise, if the determination is "Yes" in Step 403, then, whether or not any of the object display fixing functions (e.g., first grab function) is applied to that object is determined (Step 405). If that function is applied, that object is fixedly displayed in the field of view V at a time when an intended condition is satisfied (Step 406). Otherwise, if any display-fixing function is not applied, that object is drawn in the field of view V at a time when the object position is caught in the field of view V (Step 407).

Hereinafter, the above-mentioned processes are repeated. With this, it becomes possible to provide the latest object corresponding to the current position of the user U via the display unit 10 to the user U.

Second Embodiment

Next, a second embodiment of the present technology will be described. Hereinafter, configurations different from those of the first embodiment will be mainly described and descriptions of the same configurations as those of the embodiment will be omitted or simplified.

A head-mounted display according to this embodiment includes a display unit that is configured to be mountable on a head of a user and is capable of providing the user with a field of view of a real space, a detector that detects an azimuth of the display unit, and a display control unit that displays an image in the field of view based on an output of the detector.

The display control unit moves the image in the field of view in accordance with a change in azimuth when the azimuth is changed by a first predetermined angle or more.

The display control unit fixes a display position of the image in the field of view when a change in azimuth is smaller than the first predetermined angle.

The display unit and the detector correspond to the display unit 10 and the detector 20 described in the first embodiment, respectively. The display control unit corresponds to the display control unit 314 having the object display fixing function ((1) introduction of non-strict attribute) described in the first embodiment.

That is, the head-mounted display according to this embodiment is applicable to another arbitrary coordinate system in which the world coordinates are not limited to the cylindrical coordinates. Also in this embodiment, the same actions and effects as those in the first embodiment can be obtained. That is, it is possible to easily keep the object in the field of view, and hence it is possible to regulate the movement of the object, which results from a spontaneous change in attitude of the user, and to enhance the visibility of the object.

Note that, also in this embodiment, at least one of the region-limiting function and the image management function may be provided as in the first embodiment.

Third Embodiment

Next, a third embodiment of the present technology will be described. Hereinafter, configurations different from those of the first embodiment will be mainly described and descriptions of the same configurations as those of the embodiment will be omitted or simplified.

A head-mounted display according to this embodiment includes a display unit that is configured to be mountable on a head of a user and is capable of providing the user with a field of view of a real space, a detector that detects an azimuth of the display unit, and a display control unit that displays the image in the field of view based on an output of the detector.

The display control unit moves the image to a predetermined position in the field of view when a change in output of the detector is equal to or smaller than a predetermined value over a predetermined time.

Otherwise, when the display control unit detects an input of a predetermined signal generated according to a user operation, the image is moved to a predetermined position in the field of view.

The display unit and the detector correspond to the display unit 10 and the detector 20 described in the first embodiment, respectively. The display control unit corresponds to the display control unit 314 having the object display fixing function ((2) first grab function or (3) second grab function) described in the first embodiment.

That is, the head-mounted display according to this embodiment is applicable to another coordinate system whose world coordinates are not limited to the cylindrical coordinates. Also in this embodiment, the actions and effects as those in the first embodiment can be provided. That is, it is possible to easily keep the object in the field of view, and hence it is possible to regulate the movement of the object, which results from an unintended change in attitude of the user, and to enhance the visibility of the object.

Note that, also in this embodiment, at least one of the region-limiting function and the image management function may be provided as in the first embodiment.

Fourth Embodiment

Next, a fourth embodiment of the present technology will be described. Hereinafter, configurations different from those of the first embodiment will be mainly described and descriptions of the same configurations as those of the embodiment will be omitted or simplified.

A head-mounted display according to this embodiment includes a display unit that is configured to be mountable on a head of a user and is capable of providing the user with a field of view of a real space, a detector that detects an azimuth of the display unit, and a display control unit that displays the image in the field of view based on an output of the detector.

In a state in which the image is displayed at a predetermined position in the field of view, when a change in output of the detector is equal to or higher than a predetermined frequency, the display control unit cancels frequency components of the output of the detector, which are equal to or higher than the predetermined frequency.

The display unit and the detector correspond to the display unit 10 and the detector 20 described in the first embodiment, respectively. The display control unit corresponds to the display control unit 314 having the object display fixing function ((4) image stabilization function) described in the first embodiment.

That is, the head-mounted display according to this embodiment is applicable to another arbitrary coordinate system whose world coordinates are not limited to the cylindrical coordinates. Also in this embodiment, it is possible to acquire the same actions and effects as those in the above-mentioned first embodiment. That is, it is possible to ensure the visibility of the image without receiving the influence of a slight shake of the face of the user.

Note that, also in this embodiment, at least one of the region-limiting function and the image management function may be provided as in the first embodiment.

Although the embodiments of the present technology have been described, the present technology is not limited only to the above-mentioned embodiments and various changes can be added without departing from the gist of the present technology, of course.

For example, although the example in which the present technology is applied to the HMD has been described in each of the above-mentioned embodiments, the present technology is applicable also to a head up display (HUD) installed into, for example, a compartment of a vehicle or a cockpit of an airplane as the image display apparatus other than the HMD.

Further, although the application example to the see-through-type HMD has been described in each of the above-mentioned embodiments, the present technology is applicable also to a non-see-through-type HMD. In this case, predetermined objects according to the present technology only need to be displayed in an external field of view captured by a camera mounted on the display unit.

In addition, although the HMD 100 is configured to display an object including information relating to a predetermined target present in the real space in the field of view V in each of the above-mentioned embodiments, it is not limited thereto and a destination guide or the like may be displayed in the field of view V based on a current position or a direction of movement of the user U.

Note that the present technology may also take the following configurations.

(1) A head-mounted display, including:
a display unit that is configured to be mountable on a head of a user and is capable of providing the user with a field of view of a real space;
a detector that detects an azimuth of the display unit around at least one axis; and
a first control unit including
a region limiter that is capable of limiting a display region of the field of view along a direction of the one axis in three-dimensional coordinates surrounding the display unit,
a storage unit that stores images that should be displayed in the field of view with the images being made corresponding to the three-dimensional coordinates, and
a display control unit that displays, based on an output of the detector, an image in the three-dimensional coordinates, which corresponds to the azimuth, in the field of view.

(2) The head-mounted display according to (1), in which
the detector detects an azimuth of the display unit around a vertical axis, and
the region limiter limits a region in a height direction in cylindrical coordinates around the vertical axis in accordance with a region of the field of view in a vertical direction.

(3) The head-mounted display according to (2), in which
the region limiter limits the region in the height direction in the cylindrical coordinates to a height such that at least part of the images stored in the storage unit is displayed in the field of view.

(4) The head-mounted display according to any one of (1) to (3), in which
the display control unit
moves, when the azimuth is changed by a first predetermined angle or larger, the image in the field of view in accordance with a change in azimuth, and
fixes a display position of the image in the field of view when the change in azimuth is smaller than the first predetermined angle.

(5) The head-mounted display according to (4), in which
the detector further detects a change in attitude of the display unit around a horizontal axis, and
the display control unit
moves, when the change in attitude is equal to or larger than a second predetermined angle, the image in the field of view in accordance with the change in attitude, and
fixes, when the change in attitude is smaller than the second predetermined angle, the display position of the image in the field of view.

(6) The head-mounted display according to any one of (1) to (3), in which
the display control unit moves the image to a predetermined position in the field of view when a change in output of the detector is equal to or smaller than a predetermined value over a predetermined time.

(7) The head-mounted display according to any one of (1) to (6), in which
the display control unit moves the image to a predetermined position in the field of view when an input of a predetermined signal generated according to an operation of the user is detected.

(8) The head-mounted display according to any one of (1) to (7), in which
the display control unit cancels, when a change in output of the detector is equal to or higher than a predetermined frequency in a state in which the image is displayed at a predetermined position in the field of view, a frequency component of the output of the detector, which is equal to or higher than the predetermined frequency.

(9) The head-mounted display according to any one of (1) to (8), in which
the first control unit limits, when an input of a predetermined signal generated according to an operation of the user is detected, a region in the height direction in the three-dimensional coordinates in accordance with a region of the field of view in the direction of the one axis, and adjusts all the images displayed in the field of view to the same height in the field of view.

(10) The head-mounted display according to any one of (1) to (9), in which
the image includes information relating to a predetermined target present in the field of view.

(11) The head-mounted display according to any one of (1) to (10), in which
the image includes an animation image.

(12) The head-mounted display according to any one of (1) to (11), in which
the detector includes a terrestrial magnetism sensor.

(13) The head-mounted display according to any one of (1) to (12), in which
the detector includes a motion sensor that detects a motion of the display unit.

(14) The head-mounted display according to any one of (1) to (13), further including
a second control unit including an image acquisition unit that acquires a plurality of images stored in the storage unit.

(15) The head-mounted display according to (14), in which
the first control unit requests the second control unit to transmit one or more images selected from among the plurality of images.

(16) The head-mounted display according to (13) or (14), in which
the first control unit requests the second control unit to preferentially transmit an image made corresponding to a coordinate position closer to the display region of the field of view in the three-dimensional coordinates.

(17) The head-mounted display according to (16), in which
the image is an animation image, and
the first control unit requests the second control unit to collectively transmit at least some of all images constituting the animation image.

(18) The head-mounted display according to (16) or (17), in which
the first control unit regularly evaluates, with respect to all the images stored in the storage unit, a distance between the coordinate position and the display region of the field of view and removes an image at a coordinate position furthest from the display region of the field of view from the storage unit.

(19) The head-mounted display according to any one of (14) to (18), in which
the second control unit further includes a position information acquisition unit that is capable of acquiring position information of the display unit, and
the image acquisition unit acquires an image corresponding to the position information that can be transmitted to the first control unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF SYMBOLS 10 display unit
11R, 11L display surface
12R, 12L image generator
20 detector
30 control unit
100 head-mounted display (HMD)
200 portable information terminal
311 coordinate setting unit
312 image management unit
313 coordinate determination unit
314 display control unit
A1 to A4 target
B, B1 to B4 object
C0, C1 cylindrical coordinate (world coordinate)
V field of view
U user

The invention claimed is:

1. A head-mounted display, comprising:
a display unit that is configured to be mountable on a head of a user and is capable of providing the user with a field of view of a real space;
a detector that detects an azimuth of the display unit around at least one axis;
a region limiter that is capable of limiting a display region of the field of view along a direction of the one axis in three-dimensional coordinates surrounding the display unit;
a storage unit that stores images that should be displayed in the field of view with the images being made corresponding to the three-dimensional coordinates;
a display control unit that displays, based on an output of the detector, an image in the three-dimensional coordinates, which corresponds to the azimuth, in the field of view; and
a second control unit including an image acquisition unit that acquires a plurality of images stored in the storage unit,
wherein the region limiter, the storage unit, and the display control unit constitute a first control unit, and the first control unit is configured to request the second control unit to preferentially transmit an image made corresponding to a coordinate position closer to the display region of the field of view in the three-dimensional coordinates.

2. The head-mounted display according to claim 1, wherein
the detector detects an azimuth of the display unit around a vertical axis, and
the region limiter limits a region in a height direction in cylindrical coordinates around the vertical axis in accordance with a region of the field of view in a vertical direction.

3. The head-mounted display according to claim 2, wherein
the region limiter limits the region in the height direction in the cylindrical coordinates to a height such that at least part of the images stored in the storage unit is displayed in the field of view.

4. The head-mounted display according to claim 1, wherein the display control unit
moves, when the azimuth is changed by a first predetermined angle or larger, the image in the field of view in accordance with a change in azimuth, and
fixes a display position of the image in the field of view when the change in azimuth is smaller than the first predetermined angle.

5. The head-mounted display according to claim 4, wherein the detector further detects a change in attitude of the display unit around a horizontal axis, and the display control unit moves, when the change in attitude is equal to or larger than a second predetermined angle, the image in the field of view in accordance with the change in attitude, and fixes, when the change in attitude is smaller than the second predetermined angle, the display position of the image in the field of view.

6. The head-mounted display according to claim 1, wherein the display control unit moves the image to a predetermined position in the field of view when a change in output of the detector is equal to or smaller than a predetermined value over a predetermined time.

7. The head-mounted display according to claim 1, wherein the display control unit moves the image to a predetermined position in the field of view when an input of a predetermined signal generated according to an operation of the user is detected.

8. The head-mounted display according to claim 1, wherein the display control unit cancels, when a change in output of the detector is equal to or higher than a predetermined frequency in a state in which the image is displayed at a predetermined position in the field of view, a frequency component of the output of the detector, which is equal to or higher than the predetermined frequency.

9. The head-mounted display according to claim 1, wherein
the region limiter, the storage unit, and the display control unit constitute a first control unit, and
the first control unit limits, when an input of a predetermined signal generated according to an operation of the user is detected, a region in the height direction in the three-dimensional coordinates in accordance with a region of the field of view in the direction of the one axis, and adjusts all the images displayed in the field of view to the same height in the field of view.

10. The head-mounted display according to claim 1, wherein the image includes information relating to a predetermined target present in the field of view.

11. The head-mounted display according to claim 1, wherein the image includes an animation image.

12. The head-mounted display according to claim 1, wherein the detector includes a terrestrial magnetism sensor.

13. The head-mounted display according to claim 1, wherein the detector includes a motion sensor that detects a motion of the display unit.

14. The head-mounted display according to claim 1, wherein
the region limiter, the storage unit, and the display control unit constitute a first control unit, and
the first control unit requests the second control unit to transmit one or more images selected from among the plurality of images.

15. The head-mounted display according to claim 1, wherein the image is an animation image, and
the first control unit requests the second control unit to collectively transmit at least some of all images constituting the animation image.

16. The head-mounted display according to claim 1, wherein the first control unit regularly evaluates, with respect to all the images stored in the storage unit, a distance between the coordinate position and the display region of the field of view and removes an image at a coordinate position furthest from the display region of the field of view from the storage unit.

17. The head-mounted display according to claim 1, wherein
the region limiter, the storage unit, and the display control unit constitute a first control unit,
the second control unit further includes a position information acquisition unit that is capable of acquiring position information of the display unit, and
the image acquisition unit acquires an image corresponding to the position information that can be transmitted to the first control unit.

18. An image display apparatus, comprising:
a display unit including a display surface that is capable of providing a field of view of a real space;
a detector that detects an azimuth of the display unit around at least one axis;
a region limiter that is capable of limiting a display region of the field of view along a direction of the one axis in three-dimensional coordinates surrounding the display unit;
a storage unit that stores images that should be displayed in the field of view with the images being made corresponding to the three-dimensional coordinates;
a display control unit that displays, based on an output of the detector, an image in the three-dimensional coordinates, which corresponds to the azimuth, in the field of view; and
a second control unit including an image acquisition unit that acquires a plurality of images stored in the storage unit,
wherein the region limiter, the storage unit, and the display control unit constitute a first control unit, and the first control unit is configured to request the second control unit to preferentially transmit an image made corresponding to a coordinate position closer to the display region of the field of view in the three-dimensional coordinates.

19. An image display method, comprising:
detecting an azimuth of a display unit around at least one axis, the display unit being capable of providing a field of view of a real space;
storing images that should be displayed in the field of view with the images being made corresponding to three-dimensional coordinates surrounding the display unit;
limiting a display region of the field of view along a direction of the one axis in the three-dimensional coordinates; and
displaying, based on an output of the detector, an image in the three-dimensional coordinates, which corresponds to the azimuth, in the field of view,
wherein a second control unit including an image acquisition unit that acquires a plurality of images stored in the storage unit, and
wherein the region limiter, the storage unit, and the display control unit constitute a first control unit, and the first control unit is configured to request the second control unit to preferentially transmit an image made corresponding to a coordinate position closer to the display region of the field of view in the three-dimensional coordinates.

* * * * *